United States Patent
Bhaskar et al.

(10) Patent No.: US 8,126,255 B2
(45) Date of Patent: Feb. 28, 2012

(54) SYSTEMS AND METHODS FOR CREATING PERSISTENT DATA FOR A WAFER AND FOR USING PERSISTENT DATA FOR INSPECTION-RELATED FUNCTIONS

(75) Inventors: Kris Bhaskar, San Jose, CA (US); Chetana Bhaskar, San Jose, CA (US); Ashok Kulkarni, San Jose, CA (US); Eliezer Rosengaus, Palo Alto, CA (US); Cecelia Campochiaro, Sunnyvale, CA (US); Chris Maher, Campbell, CA (US); Brian Duffy, San Jose, CA (US); Aneesh Khullar, Sunnyvale, CA (US); Alpa Kohli, Saratoga, CA (US); Lalita A. Balasubramanian, Fremont, CA (US); Santosh Bhattacharyya, San Jose, CA (US); Mohan Mahadevan, Livermore, CA (US)

(73) Assignee: KLA-Tencor Corp., San Jose, CA (US)

( * ) Notice: Subject to any disclaimer, the term of this patent is extended or adjusted under 35 U.S.C. 154(b) by 779 days.

(21) Appl. No.: 12/234,201

(22) Filed: Sep. 19, 2008

(65) Prior Publication Data
US 2009/0080759 A1 Mar. 26, 2009

Related U.S. Application Data

(60) Provisional application No. 60/974,030, filed on Sep. 20, 2007.

(51) Int. Cl.
*G06K 9/00* (2006.01)
(52) U.S. Cl. .......................... 382/141; 382/145; 382/154

(58) Field of Classification Search .................. 382/141, 382/144, 145, 154, 287, 294, 147, 149, 305, 382/317; 356/237.1–237.5; 707/3, 4, 5
See application file for complete search history.

(56) References Cited

U.S. PATENT DOCUMENTS

| | | | |
|---|---|---|---|
| 5,321,505 A * | 6/1994 | Leddy | 348/383 |
| 5,761,064 A * | 6/1998 | La et al. | 700/110 |
| 6,377,898 B1 * | 4/2002 | Steffan et al. | 702/82 |
| 6,855,568 B2 | 2/2005 | Weiner et al. | |
| 6,886,153 B1 | 4/2005 | Bevis | |

(Continued)

OTHER PUBLICATIONS

U.S. Appl. No. 12/176,095 (Bhaskar et al.) entitled Methods for Generating a Standard Reference Die for Use in a Die to Standard Reference Die Inspection and Methods for Inspecting a Wafer filed on Jul. 18, 2008.

(Continued)

*Primary Examiner* — Sang Nguyen
(74) *Attorney, Agent, or Firm* — Ann Marie Mewherter

(57) ABSTRACT

Various systems and methods for creating persistent data for a wafer and using persistent data for inspection-related functions are provided. One system includes a set of processor nodes coupled to a detector of an inspection system. Each of the processor nodes is configured to receive a portion of image data generated by the detector during scanning of a wafer. The system also includes an array of storage media separately coupled to each of the processor nodes. The processor nodes are configured to send all of the image data or a selected portion of the image data received by the processor nodes to the arrays of storage media such that all of the image data or the selected portion of the image data generated by the detector during the scanning of the wafer is stored in the arrays of the storage media.

61 Claims, 6 Drawing Sheets

U.S. PATENT DOCUMENTS

| | | | |
|---|---|---|---|
| 6,898,304 B2 * | 5/2005 | Naftali et al. | 382/149 |
| 6,985,220 B1 * | 1/2006 | Chen et al. | 356/237.5 |
| 6,990,385 B1 * | 1/2006 | Smith et al. | 700/110 |
| 7,024,339 B1 | 4/2006 | Bhaskar et al. | |
| 7,184,152 B2 * | 2/2007 | Brill | 356/636 |
| 7,251,586 B2 | 7/2007 | Bhaskar et al. | |
| 7,379,847 B1 * | 5/2008 | Blecher et al. | 702/185 |
| 7,437,510 B2 * | 10/2008 | Rosenbluth et al. | 711/118 |
| 7,440,640 B1 * | 10/2008 | Bhaskar et al. | 382/317 |
| 7,440,942 B2 * | 10/2008 | Dixon et al. | 1/1 |
| 7,570,796 B2 * | 8/2009 | Zafar et al. | 382/144 |
| 2001/0053557 A1 | 12/2001 | Park | |
| 2002/0072133 A1 | 6/2002 | Jun et al. | |
| 2005/0094136 A1 | 5/2005 | Xu et al. | |
| 2006/0030060 A1 | 2/2006 | Noguchi et al. | |
| 2006/0209313 A1 * | 9/2006 | Van Den Akker et al. | 358/1.1 |
| 2007/0156379 A1 | 7/2007 | Kulkarni et al. | |
| 2007/0288219 A1 | 12/2007 | Zafar et al. | |
| 2008/0013083 A1 | 1/2008 | Kirk et al. | |
| 2008/0018887 A1 | 1/2008 | Chen et al. | |
| 2008/0032429 A1 | 2/2008 | Chen et al. | |
| 2008/0163140 A1 | 7/2008 | Fouquet et al. | |
| 2008/0250384 A1 | 10/2008 | Duffy et al. | |

OTHER PUBLICATIONS

U.S. Appl. No. 60/950,974 (Bhaskar et al.) entitled Methods for Generating a Standard Reference Die for Use in a Die to Standard Reference Die Inspection and Methods for Inspecting a Wafer filed on Jul. 20, 2007.

U.S. Appl. No. 60/870,724 (Duffy et al.) entitled Methods and Systems for Creating Inspection Recipes Using Design Data filed on Dec. 19, 2006.

U.S. Appl. No. 60/868,769 (Fouquet et al.) entitled Methods, Designs, Defect Review Tools, and Systems for Locating Systematic Defects in a Defect Review Process filed on Dec. 6, 2006.

U.S. Appl. No. 11/830,485 (Kulkarni et al.) entitled Semiconductor Device Property Extraction, Generation, Visualization, and Monitoring Methods filed on Jul. 30, 2007.

U.S. Appl. No. 11/837,204 (Cooper) entitled Computer-Implemented Methods, Carrier Media, and Systems for Rendering a Height Field for an Object filed on Aug. 10, 2007.

U.S. Appl. No. 11/855,581 (Wu et al.) entitled Computer-Implemented Methods, Carrier Media, and Systems for Displaying an Image of at Least a Portion of a Wafer filed on Sep. 14, 2007.

U.S. Appl. No. 11/855,573 (Wu et al.) entitled Computer-Implemented Methods, Carrier Media, and Systems for Storing Image Data for a Wafer filed on Sep. 14, 2007.

Vij et al. "Texas Instruments—The Challenges & Advantages of Logic Mapping" (2003).

International Search Report and Written Opinion for PCT/US2008/077203 mailed on Mar. 21, 2009.

* cited by examiner

SYSTEMS AND METHODS FOR CREATING PERSISTENT DATA FOR A WAFER AND FOR USING PERSISTENT DATA FOR INSPECTION-RELATED FUNCTIONS

PRIORITY CLAIM

This application claims priority to U.S. Provisional Application No. 60/974,030 entitled "Systems and Methods for Creating Persistent Data for a Wafer and for Using Persistent Data for Inspection-Related Functions," filed Sep. 20, 2007, which is incorporated by reference as if fully set forth herein.

BACKGROUND OF THE INVENTION

1. Field of the Invention

The present invention generally relates to systems and methods for creating persistent data for a wafer and using persistent data for inspection-related functions. Certain embodiments relate to a system configured to store image data generated by scanning a wafer with an inspection system such that all of the image data or a selected portion of the image data generated by a detector during the scanning of the wafer is stored and can be used for one or more applications.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Automated surface inspection is important to a number of different fields. For instance, inspection is substantially important when fabricating semiconductors to improve yields and provide process control. In particular, inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Surface inspection is particularly challenging for semiconductor wafers in that the dimensions of structures present on the surface are extremely small and are continuously getting smaller as technology progresses. The size of the structures requires inspection systems to have extremely high resolution, which in turn translates to a substantially large amount of data collected during the inspection process. For example, the inspection of a single 300 mm diameter wafer may generate in excess of 3 terabytes of image data collected in 5 minutes or less when using current inspection systems such as the 2810 system, which is commercially available from KLA-Tencor, San Jose, Calif.

Because of the enormous amount of data generated by inspection, common practice is to design wafer inspection systems so that they process the acquired data rapidly since storing this amount of data would be either substantially expensive or practically impossible due to the underlying limitations of the technology used in the computers implementing the inspection algorithms. For example, current wafer inspection systems may utilize multiple processors (called nodes) with dedicated memory in each to distribute the computation load required to handle data streaming in from a sensor. This data may be partitioned into swaths across the wafer, and the swaths may be further sub-divided into sub-swaths, each sub-swath being processed by one node. The results of computation are passed to a host computer, and the memory of each node is cleared to make way for the data for the next (sub) swath. No "state" information about the previous scan is retained. In other words, the data from the sensor is discarded when the node reaches the end of the swath. As such, the node has no memory across scans.

Therefore, due to the large amount of data acquired, most wafer inspection has been implemented by providing image processing equipment capable of executing a defect detection algorithm at speeds matching those of the data acquisition apparatus. Executing the defect detection algorithm at such speeds often limits the complexity of the algorithm used. In particular, relatively simple algorithms may be used to ensure that the data is processed as fast as it is acquired. Alternatively, more complex defect detection algorithms that process data slower than the data acquisition rate may be used, but such algorithms require slower data acquisition thereby reducing the overall throughput of the inspection system.

Accordingly, it would be advantageous to develop systems and methods for creating persistent data for a wafer and using persistent data for inspection-related functions.

SUMMARY OF THE INVENTION

The following description of various embodiments of systems and methods is not to be construed in any way as limiting the subject matter of the appended claims.

One embodiment relates to a system configured to store image data generated by scanning a wafer with an inspection system. The system includes a set of processor nodes coupled to a detector of an inspection system. Each of the processor nodes is configured to receive a portion of image data generated by the detector during scanning of the wafer. The system also includes an array of storage media separately coupled to each of the processor nodes. The processor nodes are configured to send all of the image data or a selected portion of the image data received by the processor nodes to the arrays of storage media such that all of the image data or the selected portion of the image data generated by the detector during the scanning of the wafer is stored in the arrays of the storage media.

In one embodiment, each of the arrays of the storage media includes a redundant array of independent disk drives. In another embodiment, each of the arrays of the storage media includes computer memory. In an additional embodiment, each of the arrays of the storage media includes a magnetic storage system. In a further embodiment, the set of processor nodes is configured as a column of processor nodes, and the system includes one or more additional columns of processor nodes coupled to the column of processor nodes.

In one embodiment, each of the processor nodes includes an image computer, and the image computers are interconnected using an Advanced Switching Interconnect (ASI) fabric. In one such embodiment, the set of processor nodes is configured as a column of processor nodes. In such an embodiment, the system may include an additional column of processor nodes coupled to the column of processor nodes. The processor nodes in the additional column may be configured to perform acquisition of the image data generated by the detector, pre-processing of the image data generated by the detector, and image buffering of the image data generated by the detector. The processor nodes in the additional column may be plugged into the ASI fabric.

In one embodiment, all of the image data generated by the detector during the scanning of the wafer includes more than one terabyte of image data. In another embodiment, the image data stored in the arrays of the storage media includes raw image data. In an additional embodiment, the image data is stored in the arrays of the storage media before defect detection is performed using the image data.

In one embodiment, the set of processor nodes is configured such that the image data is stored in the arrays of the storage media as the image data is received by the set of processor nodes. In another embodiment, the set of processor nodes and the arrays of the storage media are configured as a stand alone subsystem configured to simulate the inspection system. In an additional embodiment, the set of processor nodes and the arrays of the storage media can be used as a proxy for a full inspection system. In a further embodiment, the set of processor nodes and the arrays of the storage media are configured to function as a stand alone subsystem that emulates a user interface of the inspection system. In some embodiments, the set of processor nodes is configured to perform one or more functions in an offline mode to simulate one or more functions that could be performed by or using the inspection system. In yet another embodiment, the set of processor nodes and the arrays of the storage media are configured as a virtual inspection system. In another embodiment, the set of processor nodes is configured to combine the image data stored in the arrays of the storage media with a stream of image data as the stream of image data is generated by the detector and received by the set of processor nodes. In an additional embodiment, the set of processor nodes and the arrays of the storage media are embedded in the inspection system.

In one embodiment, the set of processor nodes is configured to generate an image of the entire wafer using all of the image data generated by the detector during the scanning of the wafer that is stored in the arrays of the storage media. In some embodiments, the wafer includes a patterned wafer. In another embodiment, the set of processor nodes is configured to use the image data stored in the arrays of the storage media to allow a user to navigate through an image of the entire wafer without using the physical wafer for navigation.

In an additional embodiment, the set of processor nodes is configured to archive images of the wafer acquired in multiple imaging modes of the inspection system, and the archived images can be used for mode selection for an inspection recipe. In some embodiments, the set of processor nodes is configured to tune an inspection recipe using the image data stored in the arrays of the storage media.

In one embodiment, the set of processor nodes is configured to select one or more defect detection parameters for inspection of the wafer using all of the image data or the selected portion of the image data generated by the detector during the scanning of the wafer that is stored in the arrays of the storage media. In another embodiment, the set of processor nodes is configured to select one or more defect detection parameters for inspection of the wafer using the image data generated by the detector during the scanning of the wafer that is stored in the arrays of the storage media without requiring additional image data generated by performing additional scanning of the wafer.

In some embodiments, the set of processor nodes is configured to select one or more defect detection parameters for inspection of the wafer by identifying two or more different types of regions on the wafer using the image data stored in the arrays of the storage media and by separately determining the one or more defect detection parameters for the two or more different types of regions using the image data stored in the arrays of the storage media.

In one embodiment, the inspection system is configured as a bright field small pixel inspection system, and the set of processor nodes is configured to archive images of wafers generated by the inspection system. In another embodiment, the set of processor nodes is configured to perform offline image analysis of the image data stored in the arrays of the storage media to identify an inspection sample plan for another inspection system that has a lower throughput and higher resolution than the inspection system.

In one embodiment, the set of processor nodes is configured to detect defects on the wafer only after all of the image data or the selected portion of the image data generated by the detector during the scanning of the wafer is stored. In one such embodiment, defect detection is performed by applying a defect detection algorithm to the image data, and the defect detection algorithm is selected regardless of the speed at which the defect detection algorithm can be applied to the image data.

In some embodiments, the set of processor nodes is configured to detect defects on the wafer by applying two or more defect detection algorithms to the image data stored in the arrays of the storage media. In one such embodiment, the two or more defect detection algorithms are different in at least one parameter of the two or more defect detection algorithms.

In one embodiment, the set of processor nodes is configured to detect defects on the wafer by processing the image data stored in the arrays of the storage media in multiple passes. In one such embodiment, one of the multiple passes includes identifying one or more portions of the image data corresponding to one or more regions of interest on the wafer. In another such embodiment, one of the multiple passes includes applying one or more algorithms to the image data to extract the defects and suppress detection of false defects.

In one embodiment, the set of processor nodes is configured to detect defects on the wafer using multiple streams of image data stored in the arrays of the storage media. In another embodiment, the set of processor nodes is configured to detect defects on the wafer using multiple streams of image data, one of the multiple streams includes the image data stored in the arrays of the storage media, another of the multiple streams includes image data generated by the detector during additional scanning of the wafer, and the scanning and the additional scanning are performed with one or more different parameters of the inspection system.

In another embodiment, the set of processor nodes is configured to detect defects on the wafer using multiple streams of data, and the multiple streams include the image data stored in the arrays of the storage media, statistical data for the wafer, and design data for the wafer. In an additional embodiment, the set of processor nodes is configured to detect defects on the wafer using multiple streams of data, one of the multiple streams includes the image data stored in the arrays of the storage media, and another of the multiple streams includes data not acquired by the inspection system.

In one embodiment, the set of processor nodes is configured to perform wafer inspection using a die context map stored in the arrays of the storage media for binning of defects detected during the wafer inspection and for determining sensitivity regions for the wafer inspection. In another embodiment, the set of processor nodes is configured to generate a die context map from design layout generated offline and to store the resulting die context map in the arrays of the storage media. In an additional embodiment, the set of processor nodes is configured to generate a die context map using image processing algorithms to process a wafer image previously stored in the arrays of the storage media and to store the die context map in the arrays of the storage media.

In one embodiment, the set of processor nodes is configured to detect defects on the wafer using the image data stored in the arrays of the storage media by comparing a portion of the image data corresponding to a die on the wafer to a standard reference die and by comparing a different portion of the image data corresponding to the die on the wafer to a corresponding portion of the image data corresponding to a different die on the wafer.

In one embodiment, the set of processor nodes is configured to detect defects on the wafer using the image data stored in the arrays of the storage media by comparing a portion of the image data corresponding to a die on the wafer to another portion of the image data corresponding to a different die on the wafer. In one such embodiment, the portion of the image data and the other portion of the image data are included in a single stream of the image data.

In another embodiment, the set of processor nodes is configured to generate a standard reference die using image data for two or more dies on one or more wafers and to store the standard reference die in the arrays of the storage media. In another embodiment, the set of processor nodes is configured to perform wafer inspection by comparing image data corresponding to a die on the wafer to a standard reference die, and the image data corresponding to the die on the wafer and the standard reference die are stored in the arrays of the storage media. In an additional embodiment, the set of processor nodes is configured to perform wafer inspection by comparing a standard reference die stored in the arrays of the storage media to image data corresponding to a die on the wafer as the image data corresponding to the die is received from the detector.

In some embodiments, the set of processor nodes is configured to perform wafer property signature analysis using the image data stored in the arrays of the storage media. In one embodiment, the set of processor nodes is configured to generate an image of the entire wafer using all of the image data generated by the detector during the scanning of the wafer that is stored in the arrays of the storage media, and the set of processor nodes is configured to perform local image processing of the image and non-local image processing of the image. In another embodiment, the set of processor nodes is configured to perform processing of the image data stored in the arrays of the storage media and to use results of processing of the image data to determine if additional image data for the wafer is to be acquired by scanning the wafer or from the arrays of the storage media. In an additional embodiment, the set of processor nodes is configured to generate an image of the wafer using the image data stored in the arrays of the storage media and at least one additional source of data for the wafer.

In one embodiment, the set of processor nodes is configured to compare the image data for the wafer stored in the arrays of the storage media with image data for another wafer. In one such embodiment, the wafer and the other wafer are processed using different values for at least one wafer-level parameter of a process.

In some embodiments, the set of processor nodes is configured to generate an image of the entire wafer using all of the image data generated by the detector during the scanning of the wafer that is stored in the arrays of the storage media, and the set of processor nodes is configured to send the image to a review system on which defects on the wafer are to be reviewed such that the image and output for the wafer generated by the review system can be used to select one or more defect detection parameters for inspection of the wafer using the image of the entire wafer and without requiring additional image data generated by the inspection system.

In one embodiment, the set of processor nodes is configured to use the image data stored in the arrays of the storage media and results of electrical testing to determine if one or more characteristics of the wafer are causally related to the results of the electrical testing. In another embodiment, the set of processor nodes is configured to use the image data stored in the arrays of the storage media and results of electrical testing to select one or more defect detection parameters for inspection of the wafer, and the inspection is to be performed using the image data stored in the arrays of the storage media. In an additional embodiment, the set of processor nodes is configured to use the image data stored in the arrays of the storage media and results of electrical testing to determine the likelihood that defects on the wafer caused the results of the electrical testing. In a further embodiment, the set of processor nodes is configured to use the image data stored in the arrays of the storage media, results of electrical testing, design data, and netlist data to determine the likelihood that defects on the wafer caused the results of the electrical testing. In some embodiments, the set of processor nodes is configured to alter one or more parameters of an inspection process to be performed on the image data stored in the arrays of the storage media using results of electrical testing in combination with mapping of the results of the electrical testing to physical locations on the wafer. In yet another embodiment, the set of processor nodes is configured to use the image data stored in the arrays of the storage media and results of electrical testing to determine a likelihood that defects on the wafer caused the results of the electrical testing, and the set of processor nodes is configured to determine one or more parameters of physical analysis to be performed on the wafer based on the likelihood.

In some embodiments, the image data is generated by the detector during the scanning of the wafer using more than one optical configuration of the inspection system.

Each of the embodiments of the system described above may be further configured as described further herein.

Another embodiment relates to an inspection system configured to detect defects on a wafer. The system includes an inspection subsystem configured to generate image data for a wafer by scanning the wafer. The system also includes a set of processor nodes coupled to the inspection subsystem. Each of the processor nodes is configured to receive a portion of the image data generated by the inspection subsystem during the scanning of the wafer. Each of the processor nodes is also configured to detect defects on the wafer using the portion of the image data received by each of the processor nodes. In addition, the system includes an array of storage media separately coupled to each of the processor nodes. The processor nodes are configured to send all of the image data or a selected portion of the image data received by the processor nodes to the arrays of storage media such that all of the image data or the selected portion of the image data generated by the inspection subsystem during the scanning of the wafer is stored in the arrays of the storage media.

Each of the embodiments of the system described above may be further configured as described further herein.

An additional embodiment relates to a method for storing image data generated by scanning a wafer with an inspection system. The method includes separately receiving different portions of image data generated by a detector of an inspection system during scanning of a wafer. The method includes separately sending the different portions or selected portions of the different portions to different arrays of storage media such that all of the image data or a selected portion of the image data generated by the detector during the scanning of the wafer is stored in the different arrays of the storage media.

Each of the steps of the method described above may be further performed as described further herein. In addition, the embodiment of the method described above may include any other step(s) of any other method(s) described herein. Furthermore, the method described above may be performed by any of the systems described herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
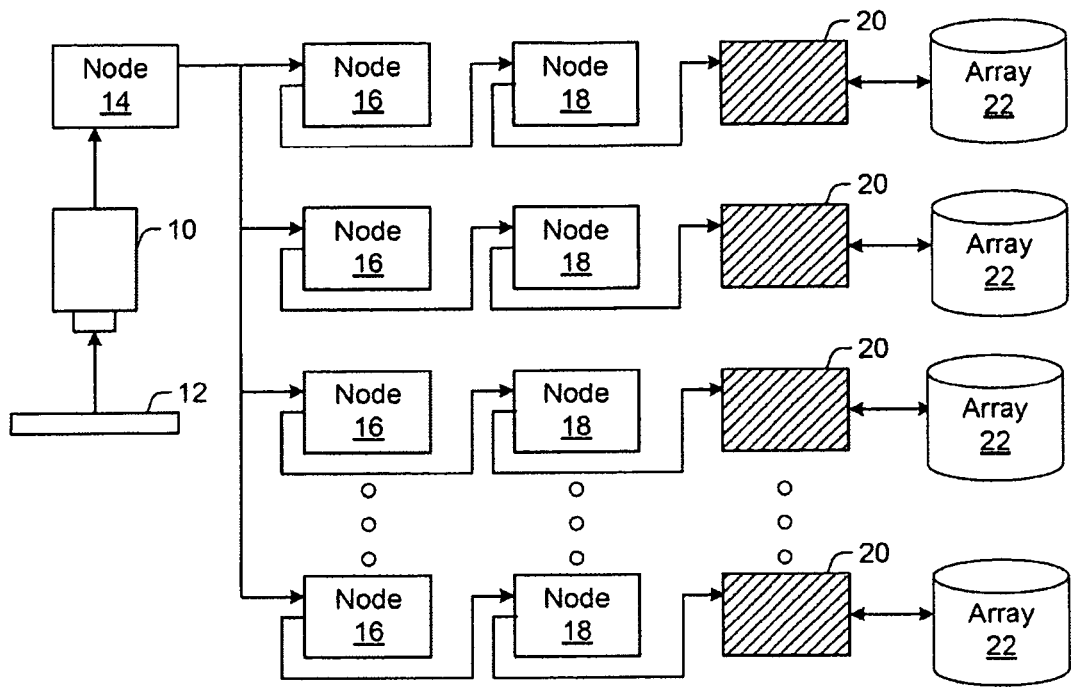
FIG. 1 is a block diagram illustrating one embodiment of a system configured to store image data generated by scanning a wafer with an inspection system.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices such as integrated circuits (ICs) may be formed on a wafer, and the term wafer as used herein is intended to encompass a wafer on which any type of device known in the art is being fabricated.

Although embodiments are described herein with respect to wafers, it is to be understood that the embodiments may be used for storing image data and/or detecting defects on another specimen such as a reticle, which may also be commonly referred to as a mask or a photomask. Many different types of reticles are known in the art, and the terms "reticle," "mask," and "photomask" as used herein are intended to encompass all types of reticles known in the art.

The term "design data" as used herein generally refers to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design data. Such a reticle image or a derivative thereof can serve as a substitute for the design layout in any embodiments described herein that use design data. The design data may include any other design data or design data proxies described in commonly owned U.S. patent application Ser. Nos. 11/561,735 by Kulkarni et al., which published on Jul. 7, 2007 as U.S. Patent Application Publication No. 2007/0156379, and 11/561,659 by Zafar et al., which published on Dec. 13, 2007 as U.S. Patent Application Publication No. 2007/0288219, both of which were filed on Nov. 20, 2006, and both of which are incorporated by reference as if fully set forth herein.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

In general, the embodiments described herein relate to the field of surface inspection, particularly inspection of complex patterned surfaces such as those found on semiconductor wafers. The embodiments described herein also relate to methods and systems for surface inspection using persistent data. For example, some embodiments described herein make extensive use of data persistence concepts, in which electronic data acquired during a surface scan is stored for later use. In one such example, the embodiments described herein can be used to extend state-of-the-art complex patterned surface inspection systems by using persistent data to improve the sensitivity of surface inspection. The embodiments described herein can also be used to improve the ease of use of patterned surface inspection systems by allowing the tuning of adjustable parameters used during inspection without requiring re-scanning of the target specimen as described further herein.

Recent advances in computer technology tend towards the use of parallel computers (clusters) to create a high performance computer (HPC) platform. In addition, recent advances in magnetic storage have increased the capacity and performance of magnetic storage while reducing the price of the components. These technologies open up the possibility of using data persistence (buffering acquired image data in computer memory, magnetic storage, or a combination thereof) on a relatively large scale and at relatively reasonable costs. In this manner, the embodiments described herein can remove the current restriction of "statelessness" of computer nodes by retaining pertinent information from a scan and possibly previous scan(s) thereby allowing for a variety of types of applications, such as those described further herein.

One embodiment relates to a system configured to store image data generated by scanning a wafer with an inspection system. In this manner, the system may create persistent data for a wafer (i.e., data that persists in storage media indefinitely until it is deleted intentionally perhaps by a user). The image data may include any image data that can be generated by a detector of an inspection system. Scanning of the wafer may be performed in any suitable manner (e.g., by scanning light across the wafer and detecting light reflected and/or scattered from the wafer during scanning). In addition, the inspection system may include any suitable inspection system such as a bright field (BF) inspection system, a dark field (DF) inspection system, and the like. The inspection system may be further configured as described herein.

The system includes a set of processor nodes coupled to a detector of an inspection system. The set of processor nodes preferably includes two or more processor nodes. One such embodiment of the system is shown in FIG. 1. As shown in FIG. 1, detector 10 is configured to generate image data during scanning of wafer 12. Detector 10 may include any suitable detector of any suitable inspection system known in the art such as a sensor array or a time delay integration (TDI) sensor. The set of processor nodes includes set of processor nodes 20 coupled to detector 10. The set of processor nodes is coupled to detector 10 by one or more processors and/or one or more additional processor nodes. For example, detector 10 is coupled to processor 14. Detector 10 may be coupled to processor 14 in any suitable manner.

Processor 14 is configured to segment the image data generated by the detector into different image data streams. Processor 14 may be a "dedicated" processor in that it may be configured to perform only segmentation of the image data. Processor 14 may include any suitable processor known in the art. Processor 14 may be configured to segment the image data into different streams in any suitable manner. For example, the processor may be configured to segment the image data generated by the detector into swaths of image data, each of which may be further segmented into sub-swaths by the processor. The processor may be configured to send each of the segmented portions of the image data (e.g., the sub-swaths) to one of the processor nodes in a column.

In one embodiment, the set of processor nodes 20 is configured as a "column" of processor nodes, as shown in FIG. 1, and the system includes one or more additional columns of processor nodes coupled to the column of processor nodes. For example, each of the different image data streams generated by processor 14 may be sent to one of processor nodes 16, each of which is coupled to processor 14. As shown in FIG. 1, processor nodes 16 may be configured as a column of processor nodes. Processor nodes 16 may be configured to perform one or more processes on the portion of the image data received by each of the processor nodes. The one or more processes may include any suitable processes such as defect detection (e.g., applying a defect detection algorithm to the image data).

After processing by processor nodes 16, the different portions of the image data may be sent to processor nodes 18, which may also be configured as a column of processor nodes. Processor nodes 18 may also be configured to perform one or more processes on the portion of the image data received by each of the processor nodes. The one or more processes may include any suitable processes such as defect detection (e.g., applying a defect detection algorithm to the image data). Processor 14, set of processor nodes 16, and set of processor nodes 18 may be further configured as described in commonly owned U.S. Pat. Nos. 7,024,339 to Bhaskar et al. and 7,251,586 to Bhaskar et al., both of which are incorporated by reference as if fully set forth herein. The systems described herein may be further configured as described in these patents. For example, the systems may include a job manager described in these patents, which is configured to schedule different tasks performed by different processor nodes and/or to orchestrate or coordinate interaction and/or functioning of the processor nodes. In another example, the system may be configured such that each of the processor nodes receives the image data on lines (not shown) of a high speed network such as a fiber optic network. The fiber optic network may implement a serial, full duplex data transfer architecture.

The columns formed by the set of processor nodes 16 and the set of processor nodes 18 may form the computing columns of the system in that they may be configured to perform any pre-storage functions on the image data. After processing by processor nodes 18, the different portions of the image data may be sent to processor nodes 20, which may also be configured as a column of processor nodes. In this manner, the set of processor nodes 20 may be coupled to detector 10 of the inspection system through processor 14, processor nodes 16, and processor nodes 18, and each of processor nodes 20 is configured to receive a portion of the image data generated by the detector during scanning of the wafer.

The column formed by the set of processor nodes 20 may form the "virtual inspector" (VI) column of the system in that this column may be configured to perform storage of the image data according to any of the embodiments described herein. The processor and each of the processor nodes shown in FIG. 1 may be configured as individual computers. In some embodiments, each of the processor nodes may include an image computer or any other suitable computer described herein or known in the art. In addition, the processor nodes in any given column may preferably be connected to a network in a daisy chain topology.

Although the system shown in FIG. 1 includes three columns of processor nodes, the system may include any suitable number of columns of processor nodes (e.g., one or more columns of processor nodes). For example, in some embodiments, the system may include only the VI column of processor nodes (i.e., set of processor nodes 20). In addition, the number of columns of processor nodes is easily scalable (e.g., based on the processing of the image data to be performed by the system). For example, the system may be configured to use multiple columns if additional speed is desired. In addition, the image data may be processed in sequence by the columns of the processor nodes, and the number of columns of processor nodes included in the system may vary depending on the processing power that is needed by the system. In this manner, the system may use multiple "columns" of processor nodes, with multiple columns in series as desired.

Furthermore, although each of the columns of the processor nodes shown in FIG. 1 includes four processor nodes, the columns of the processor nodes may include any suitable number of processor nodes (e.g., two or more processor nodes). The number of processor nodes included in each of the columns is also easily scalable (e.g., based on the amount of image data that is generated by the detector of the inspection system). For example, the number of rows of processor nodes included in the system may vary depending on the input/output (I/O) capability needed by the system. As such, the architecture shown in FIG. 1 provides scalable I/O capability for data acquisition and scalable capability for processing image data.

The system also includes an array of storage media separately coupled to each of the processor nodes. For example, as shown in FIG. 1, the system includes arrays 22 of storage media coupled to processor nodes 20. Arrays 22 may be coupled to the processor nodes in any suitable manner. In addition, the storage media included in the arrays may be selected based on the configuration of the system or the inspection system (e.g., based on the amount of image data that may be stored in each of the arrays).

In one embodiment, each of the arrays of the storage media includes a redundant array of independent disk (RAID) drives (or a RAID array). In this manner, the system may include a high performance RAID array coupled to each processor node in a column. In another embodiment, each of the arrays of the storage media includes computer memory. The computer memory may include any suitable computer memory known in the art. In an additional embodiment, each of the arrays of the storage media includes a magnetic storage system. The magnetic storage system may include any suitable magnetic storage system known in the art. In this manner, the embodiments described herein include massive amounts of computer memory, high performance magnetic storage systems (such as RAID arrays), or a combination thereof to decouple data acquisition and data analysis. In addition, although the arrays of storage media are shown in FIG. 1 as being separate from the VI column of processor nodes, the arrays of the storage media may be integrated into the VI column of processor nodes. For example, each of the processor nodes included in the VI column may be an image computer, and the arrays of storage media may include memory included in the image computers.

The processor nodes (in the VI column) are configured to send all of the image data or a selected portion of the image data received by the processor nodes to the arrays of storage media such that all of the image data or the selected portion of the image data generated by the detector during the scanning of the wafer is stored in the arrays of the storage media. For example, each of the processor nodes may be configured to send a selected portion of the image data received by the processor node to the array of storage media coupled thereto such that the selected portion of the image data generated by the detector during the scanning of the wafer is stored in the arrays of the storage media. The selected portion of the image data is not selected based on the image data itself or one or more characteristics of the image data itself (such as intensity values of the image data). Therefore, the selected portion of the image data is different than portions of image data that are stored by other currently used systems in that the selected portion of the image data is not selected to include only the image data that corresponds to (or may correspond to) defects on the wafer, which can be identified based on characteristics (e.g., intensity) of the image data itself. In other words, the selected portion of the image data that is stored in the arrays of the storage media by the processor nodes is independent of any defects on the wafer (which may be detected using the image data). For example, the selected portion of the image data may include one or more portions of the image data corresponding to one or more areas of interest on the wafer. The areas of interest may be selected by a user. In this manner, the portion of the image data that is stored by the processor nodes may be effectively selected by the user. In addition, the portion of the image data that is stored by the embodiments described herein may be selected prior to scanning of the wafer (e.g., based on information about areas or potential areas of interest on the wafer). In other words, the selected portion of the image data may be selected prior to creation of the image data. In this manner, the selected portion of the image data may be selected without using the image data. Furthermore, although the processor nodes may send a selected portion of the image data received by the processor nodes to the arrays of storage media such that the selected portion of the image data generated by the detector during the scanning of the wafer is stored in the arrays of the storage media, each of the processor nodes may be advantageously configured to send the entire portion of the image data received by the processor node to the array of storage media coupled thereto such that all of the image data generated by the detector during the scanning of the wafer is stored in the arrays of the storage media.

The image data is, therefore, segmented by the system as described above, and different segments of the image data are stored in different arrays of storage media. In this manner, the system is configured for distributed storage of image data acquired by scanning a wafer. Segmentation of the image data and separate storage of the different segments is advantageous since as described herein, the image data for the entire wafer may be substantially large. For example, the size of the image data that can be stored by the embodiments described herein is so large that it cannot be stored in a single storage medium as a single file.

In addition, the VI column, unlike any other columns of processor nodes that may be included in the system, may not process the image data as it is received by the processor nodes. Instead, although the VI column may perform one or more applications using the stored image data as described further herein (e.g., for post-processing of the image data), the VI column may only store the image data during generation or acquisition of the image data.

The embodiments described herein provide a cost effective implementation of persistent data compatible with existing image computer architecture such as the image computer architecture described in the above-reference patents. For example, each of the elements of the system shown in FIG. 1 (e.g., each of the processor nodes and arrays of storage media) may include commercially available components. In particular, the components of the system shown in FIG. 1 are readily commercially available and do not require customized design and manufacture, except perhaps for an interface (not shown), which may be included in each of the processor nodes and is relatively easily produced. In one such example, the processor nodes may be dual processor G5 PowerMac computers running OS X, which are commercially available from Apple Computer, Inc., Cupertino, Calif., preferably operating at a clock speed of at least about 2 GHz. In another such example, the processor nodes may include Opteron-based computers, which are commercially available from Advanced Micro Devices, Inc., Sunnyvale, Calif., having similar speeds and memory capacity and can be used with the Linux operating system.

The processor nodes may receive the image data through interfaces, which may be installed in each processor node. The interface may be configured to receive the image data on a high speed network at a speed that is preferably at least as fast as the speed at which a given processor node can process the image data (e.g., write it to disk). In one embodiment, the interfaces are input data adapter cards having serial fiber optic inputs such as transceivers, which convert the fiber optic image data received on the fiber network into electrical image data and deliver the image data to a pre-processor such as a field programmable gate array (FPGA). The transceivers may preferably support a bandwidth of about 2.5 GB/s. In addition, each of the interfaces may have four such transceivers, with each of the transceivers in each processor node of a given row independently daisy chained to the corresponding transceivers in each of the other processor nodes within the row. Therefore, the network may provide a connection to each row of processor nodes.

Using such components in the system shown in FIG. 1 is advantageous for a number of reasons. For example, the reliability of the system is generally increased by using components for which a relatively large engineering effort has been invested, for which upgrades and fixes are continually produced, and which have a good track record in the marketplace. In addition, with relatively large numbers of a single component being produced by an original manufacturer, problems are generally discovered faster and fixed sooner.

Furthermore, commercially available computers, which can be used as the processor nodes and other components described herein, can run many different kinds of algorithms, whereas customized hardware, and more especially the customized and optimized hardware that is so prevalent in currently used inspection systems, tends to be extremely limited in what it can do, because the cost of adding additional functionality to such customized hardware is extremely high.

The set of processor nodes is preferably configured to write the image data to the arrays of the storage media at a relatively high speed. For example, the VI column may be configured to write the image data to the arrays of the storage media at a rate of about 650 MB/s per row of the processor nodes (or even about 800 MB/s per row of the processor nodes). The set of processor nodes may be further configured to store the image data for the wafer in the arrays of storage media as described in commonly owned U.S. patent application Ser. No. 11/855,573 by Wu et al. filed Sep. 14, 2007, which is incorporated by reference as if fully set forth herein. Each of the embodiments described herein may be further configured as described in this patent application.

The relentless pace of critical dimension shrinkage in semiconductors requires an even faster increase in computing power for semiconductor inspection in order to maintain or improve throughput. In other computing applications, the trend for some time has been to build HPCs by aggregating moderately powerful processors via a network or fabric. A variety of interconnects has been used for HPCs. Common interconnects include Myrinet, Infiniband, and high speed Ethernet. In most HPC applications, the goal is to provide a relatively large amount of computing power to solve a particular problem (e.g., differential equation solution, weather simulations, etc.) without regard for a high bandwidth, easy to implement data acquisition front end. Instead, the priorities are to establish a high bandwidth low latency interprocessor communication scheme that permits parallel processing to occur.

In semiconductor inspection, the same requirements for bandwidth and low latency are needed in image computers, but the front end data acquisition and signal pre-processing requirements are also crucial. Interconnects such as Infiniband satisfy the needs for HPC, but are difficult and costly to implement for low cost, front end analog-to-digital conversion (A/D) and image pre-processing boards.

Some embodiments described herein provide a new image computer architecture that can be used for semiconductor inspection. The embodiments apply emerging commodity-type interconnect standards to permit the construction of a powerful (supercomputer level) image computer and/or data acquisition network. For example, some embodiments described herein are configured as an image computer architecture using Advanced Switching Interconnect (ASI). ASI is a switching-interconnect technology that combines the advanced features of existing proprietary fabrics with industry standard technology and design practices developed by the Advanced Switching Interconnect Special Interest Group (ASI SIG™), which has since disbanded. Specifications and documentation regarding ASI can be obtained from PICMG, Wakefield, Mass. In this manner, some embodiments described herein may use emerging interconnect technologies to alleviate the shortcomings of previously used schemes such as Infiniband and to enable the design of powerful parallel processing and parallel data acquisition engines useful in wafer inspection tasks.

Figure 1A:
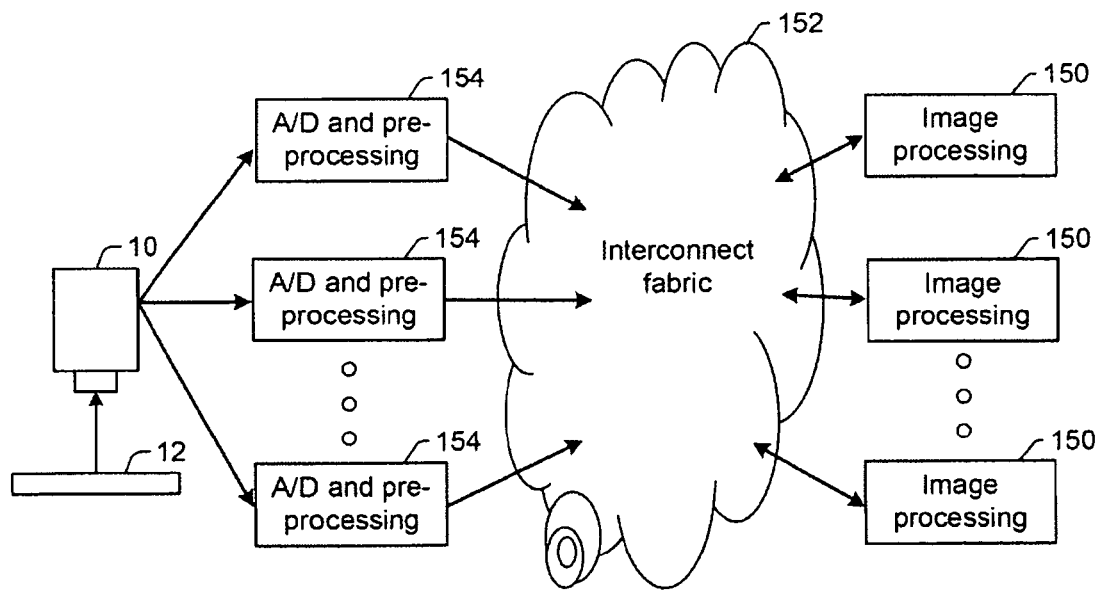
FIG. 1a is a block diagram illustrating one embodiment of a configuration that can be used to interconnect various processor nodes that may be included in the system embodiments described herein.

In one embodiment, each of the processor nodes (e.g., in the VI column) includes an image computer. The image computers may include any of the image computers described herein. In one such embodiment, the image computers are interconnected using an ASI fabric. FIG. 1a illustrates one embodiment of a configuration that can be used to interconnect various processor nodes in the system embodiments described herein. For example, as shown in FIG. 1a, the system may include processor nodes 150. The processor nodes in this embodiment are image computers that are configured to perform image processing. Processor nodes 150 may be further configured as described herein (e.g., with respect to the processor nodes included in the VI column). The image computers are interconnected using interconnect fabric 152, which in this embodiment is an ASI fabric. The image computers may be connected to the interconnect fabric in any suitable manner. In this manner, the systems described herein may be configured as a semiconductor inspection system that includes multiple image computers interconnected using an ASI fabric.

In one embodiment, the set of processor nodes 150 is configured as a column of processor nodes. The set of processor nodes may be configured as a column of processor nodes (e.g., the VI column of processor nodes) as described further herein. In one such embodiment, the system also includes an additional column of processor nodes. For example, as shown in FIG. 1a, the system may include an additional column of processor nodes 154. As shown in FIG. 1a, processor nodes 154 in the additional column may be coupled to detector 10 as described further herein such that the processor nodes in the additional column may receive the image data generated by the detector during the scanning of the wafer. In this manner, the detector (e.g., a high speed image sensor such as a charge coupled device (CCD), TDI, photomultiplier tube (PMT) array, etc.) can supply one or more data streams to processor nodes 154. The additional column of processor nodes may be further configured as described herein (e.g., with respect to column of processor nodes 16 and/or column of processor nodes 18).

As shown in FIG. 1*a*, processor nodes 154 may perform A/D and pre-processing of the image data received from the detector. For example, the processor nodes in the additional column may be configured to perform acquisition of the image data generated by the detector, pre-processing of the image data generated by the detector, and image buffering of the image data generated by the detector. Processor nodes 154 may be configured as described herein and may include hardware that is typically custom-built that digitizes the image data and performs some pre-processing (such as distortion correction, radiometric corrections, reformatting, etc.). For example, the processor nodes may include A/D cards that perform A/D. Alternatively, processor nodes 154 may be replaced with A/D cards in the embodiment shown in FIG. 1*a*. Processor nodes 154 may perform acquisition of the image data generated by the detector, pre-processing of the image data generated by the detector, and image buffering of the image data generated by the detector as described further herein and/or in any other suitable manner. In this manner, FIG. 1*a* shows a generic implementation for a data acquisition/image processing distributed computer architecture. In other words, FIG. 1*a* shows a generic distributed data acquisition/image processing engine.

The processor nodes in the additional column may also be plugged into the ASI fabric. For example, as shown in FIG. 1*a*, processor nodes 154 are plugged into interconnect fabric 152, which may be an ASI fabric. Processor nodes 154 may be plugged into the interconnect fabric in any suitable manner. In this manner, the systems described herein may be configured as semiconductor inspection systems that include data acquisition, pre-processing, and image buffering nodes plugged into an ASI fabric.

In current architectures, A/D cards are often plugged into either control or image computers because the processors in the computers can be used to control the functions of the cards. In this case, the interconnect fabric described herein can be eliminated. In modern computer architectures, the interconnection between the A/D cards and their host computers is typically PCI, PCI-X, or PCI-Express, all of which are known in the art. PCI-Express is the latest, highest bandwidth interconnect popular in high end microcomputers and larger systems.

Based on PCI-Express, the ASI standard has been developed. This new interconnect fabric is electrically compatible with PCI-Express but adds peer-to-peer and multi-protocol tunneling to the PCI-Express standard. One of the benefits of the interconnect is that PCI-Express cards can be "remoted" from their hosts transparently by tunneling through the fabric with a standard protocol such as PI-8. In other words, PCI-Express compatible A/D cards can be plugged into the ASI fabric without any changes. For example, ASI overlays the physical and link layers of PCI-Express with an optimized transaction layer. By sharing the same physical and link layers of PCI-Express, the tools from the high volume PCI-Express ecosystem can be used with ASI. In addition, ASI enables point-to-point connections between all end nodes, and multicast capabilities as well as connecting one end node to several others. The end node interconnection can be between image processing hosts as well as between front end A/D cards and hosts.

By using ASI, it is possible to design front end components that are PCI-Express compatible (at substantially low cost) and aggregate them into plug-in points that are custom-designed to provide mechanical, electrical, and thermal characteristics best suited to those cards without forcing them to be laid out in standard PCI-Express form factors and power densities.

In addition, the low latency peer-to-peer capabilities of ASI enable HPC-type interconnects between the processor nodes (hosts or image processing processor nodes such as the VI column of processor nodes) thereby enabling dynamic switching and routing of image processing tasks to those nodes that are not busy. Furthermore, should more complex algorithms be desired, additional image computing nodes can be dropped into the fabric to increase the aggregate processing power available.

The interconnection configuration shown in FIG. 1*a* and described further above may be included in any of the system embodiments described herein.

In one embodiment, all of the image data generated by the detector during the scanning of the wafer includes more than one terabyte of image data. For example, inspection of a single 300 mm diameter wafer may generate in excess of 3 terabytes of image data, and the embodiments described herein can advantageously store all 3 terabytes of the image data. In addition, many different factors of inspection combine to produce a substantially large quantity of image data at a substantially fast rate. For example, because of the substantially small size of modern ICs, imaging of the wafer by the inspection system is preferably performed at a substantially high magnification. To support optical inspection of such substantially small features, the pixel size for the detector is preferably about one tenth of a micron. This small pixel size is one of the factors in the relatively large amount of image data that is produced, and the high rate at which it is produced. In addition, the inspection system is preferably configured to scan relatively large substrates in a relatively short time (e.g., to maximize throughput). Therefore, the inspection system creates a substantially large amount of data at a substantially fast rate.

In one particular example, the inspection system may generate more than 3 billion pixels of image data per second, with each pixel having 8 gray scale bits. This image data generation may produce an image data stream of over 3 GB/s. In another example, the inspection system may acquire a stream of image data that is about 6.4 Gpixels/s, which may be segmented into a number of streams. For example, the stream of data acquired by the detector may be segmented into eight different streams, each of which includes about 800 MB/s of image data. The embodiments described herein are configured to store such large amounts of data.

In addition, despite the relatively large amount of image data that may be generated by the detector and stored by the processor nodes, additional data may also be stored in the arrays of the storage media. For example, additional persistent data such as statistical data and/or data for a standard reference die may be stored in the arrays of storage media if the volume of such additional persistent data is relatively small.

In another embodiment, the image data stored in the arrays of the storage media includes raw image data. For example, regardless of whether or not defect detection or other data processing is performed before storage of the image data, the raw image data (i.e., the image data as it is generated by the detector) can be stored in the arrays of the storage media by the set of processor nodes. In addition, if the VI column of processor nodes performs one or more data processing functions on the raw image data before storage, the VI column may store the raw image data possibly in combination with the results of the one or more data processing functions in the arrays of the storage media. Furthermore, if one of the non-VI columns of processor nodes performs one or more functions on the raw image data before the VI column of processor nodes stores the raw image data, the non-VI column(s) may send the raw image data to the VI column of processor nodes possibly in combination with the results of the one or more functions such that the VI column can write the raw image data, possibly in combination with the results of the one or more functions, to the arrays of the storage media.

In an additional embodiment, the image data is stored in the arrays of the storage media before defect detection is performed using the image data. For example, as described further herein, since all of the image data or the selected portion of the image data generated for the wafer by scanning the wafer can be stored in the arrays of the storage media by the set of processor nodes, defect detection may not be performed using the image data as the image data is generated (or during scanning of the wafer). Instead, defect detection may be performed using the image data after all of the image data or the selected portion of the image data has been stored by the embodiments described herein, which is advantageous as described further herein.

In some embodiments, the image data is generated by the detector during the scanning of the wafer using more than one optical configuration of the inspection system. The different optical configurations may include different optical modes of the inspection system. Scanning the wafer using more than one optical configuration of the inspection system may be performed in multiple passes or multiple scans. Each of the optical configurations may be used to scan the entire wafer. Therefore, the embodiments described herein may store image data (e.g., image data for an entire wafer) that is generated in multiple passes or scans. The stored image data acquired by multiple passes or scans of the wafer may be used as described further herein (e.g., for defect detection and/or for selection of one or more defect detection parameters and/or one or more optical parameters of the inspection system to be used for inspection of the wafer). In this manner, although the image data generated using each of the different optical configurations may be substantially large as described further herein, the embodiments can be configured to store all of the image data or a selected portion of the image data generated by any number of optical configurations or scans of the wafer.

In yet another embodiment, the set of processor nodes and the arrays of the storage media are configured as a virtual inspection system or virtual inspector (VI). For example, the system may be configured such that the image data stored in the arrays of the storage media can be "played-back" into the VI column of processor nodes such that the set of processor nodes can perform one or more functions using the image data. In particular, since all of the image data or the selected portion of the image data generated for a wafer during scanning of the wafer is stored by the embodiments described herein, the system may then do a number of different things with the stored image data including performing one or more inspection-related functions. Therefore, the VI column of processor nodes and the arrays of storage media may form a VI. As such, the VI is essentially a special purpose supercomputer optimized for mass storage, fast disk I/O, image processing, and visualization. This system can be embodied in a manner compatible with the environment it will run in (typically a semiconductor fab or laboratory). A VI differs from a real or non-virtual inspection system in that in the VI the raw image data acquisition is from stored data on disk rather than through image data acquired in real-time using a wafer, an optics subsystem, and electronic sensor apparatus. Therefore, the VI column of processor nodes may be utilized as a VI in a number of different manners. Some additional embodiments described herein relate to a class of applications that leverage the capabilities of a virtual wafer inspector. In particular, in embodiments described herein, unless otherwise noted, "the set of processor nodes" refers to set of processor nodes 20 or the VI column described above.

The VI may be used in a number of different modes. For example, the VI may be used in a data acquisition mode. In one such embodiment, the set of processor nodes is configured such that the image data is stored in the arrays of the storage media as the image data is received by the set of processor nodes. Such data storage may be further performed as described herein.

The VI may also be used in a mode that simulates the real inspection system (i.e., the inspection system including the imaging elements). For example, in one embodiment, the set of processor nodes and the arrays of the storage media are configured as a stand alone subsystem configured to simulate the inspection system. The set of processor nodes and the arrays of the storage media may be configured as a stand alone subsystem in that the system is not part of or included in an inspection system. The stand alone subsystem may simulate the inspection system as described further herein (e.g., by performing one or more inspection-type functions on the stored image data as those functions would be performed by the inspection system).

In another embodiment, the set of processor nodes and the arrays of the storage media can be used as a proxy for a full inspection system (i.e., the inspection system including the imaging elements). For example, the set of processor nodes may be configured to use image data stored in the arrays of the storage media to perform one or more functions that can be performed by a full inspection system. In addition, the set of processor nodes may be configured to perform such functions offline (without using the full inspection system). Therefore, the set of processor nodes and the arrays of the storage media may be used as a substitute for the full inspection system such that functions of the full inspection system can be performed by the VI while the full inspection system is free for other functions (e.g., imaging a physical wafer). Functions of a full inspection system that can be performed by the VI as a proxy for the full inspection system include, but are not limited to, training, which may be performed as described herein, and as a development platform for advanced application features including those described herein. Therefore, the VI can be used for conducting production inspection activities, which would ordinarily require use of a real wafer inspection system, such as offline recipe optimization, training, etc. As such, the VI may serve as a cost of ownership enhancement by providing a subset of inspection system functionality on a far less expensive platform than a full inspection system.

In an additional embodiment, the set of processor nodes and the arrays of the storage media are configured to function as a stand alone subsystem that emulates a user interface (UI) of the inspection system. For example, the set of processor nodes may be coupled to a display device that is configured to display results or stored image data in a UI that is substantially the same as the UI of the inspection system. Therefore, the stored image data and/or results of one or more steps performed by the processor nodes using the image data stored in the arrays of the storage media may be displayed in the UI as it would be by a full inspection system. In this manner, persistence data mechanisms can be embodied in a stand alone VI in a mode that emulates the UI of a real inspection system. In addition, persistence data mechanisms can be embodied in a stand alone VI in a scripting mode that enables the user to construct customer workflows leveraging the underlying primitive features of the VI (e.g., the scripting mode allows operations of the VI to be triggered by command line execution either interactively or in a scheduled or event triggered background process (e.g., a batch file) as an alternative to interacting with the system through a conventional graphical user interface (GUI)).

In a further embodiment, the set of processor nodes is configured to perform one or more functions in an offline mode to simulate one or more functions that could be performed by or using the inspection system. For example, the set of processor nodes may be configured to perform one or more functions (including any of the functions described further herein) in an offline mode in that the one or more functions are performed using only stored image data (stored in the arrays of the storage media). The one or more functions may include any functions that could be performed by or using the inspection system by acquiring image data for a physical wafer and using the image data as it is acquired to perform one or more functions. In this manner, in an offline mode, the VI can literally simulate the inspection system without use of the inspection system.

An additional mode in which the VI can be used is for providing a virtual stream of image data for a wafer that can be combined with a stream of image data for the wafer or a different wafer as that stream is acquired by a real inspection system. As such, in this mode, the VI may function as a data source coupled to the inspection system. For example, in one embodiment, the set of processor nodes is configured to combine the image data stored in the arrays of the storage media with a stream of image data as the stream of image data is generated by the detector and received by the set of processor nodes. In this manner, the image data from one scan of a wafer may be stored on disk (e.g., the arrays of the storage media) and during the next scan of the same wafer in a different mode than the first scan, the data from both scans may be merged by the VI. The image data stored in the arrays of the storage media may be combined with the stream of image data according to any embodiments described further herein. In addition, in a similar manner, non-image data that is stored in the arrays of the storage media may be combined with a stream of image data as that stream is generated by the detector and received by the set of processor nodes. Such non-image data may include, for example, design data, a context map, and any other non-image data described herein that may be stored in the arrays of the storage media at the time the stream of data is received by the set of processor nodes.

In yet another mode of the VI, the VI may form part of the inspection system. For instance, in one embodiment, the set of processor nodes and the arrays of the storage media are embedded in the inspection system. The VI may be embedded in the inspection system in any suitable manner. Such an embodiment of the VI may be configured to perform any of the functions of embodiments described herein online and/or offline. In this manner, the data persistence mechanisms can be embodied as embedded software and/or hardware subsystems within inspection systems, be they real or virtual inspection systems.

In one embodiment, the set of processor nodes is configured to generate an image of the entire wafer using all of the image data, generated by the detector during the scanning of the wafer, that is stored in the arrays of the storage media. The image of the entire wafer may be generated from the image data in any suitable manner. For example, since different portions of the image data are stored in different arrays of the storage media, the set of processor nodes may be configured to align different portions of the image data to each other (e.g., using information about the location on the wafer at which the image data was acquired) to generate an image for the entire wafer. In addition, although an image for an entire wafer may be generated by the VI column since all of the image data for the entire wafer can be stored by the VI column, the set of processor nodes may also be configured to generate an image of only a portion of the wafer (e.g., if an image of only a portion of the wafer is requested by a user). The portion of the wafer may include any area of the wafer such as a die on the wafer. The set of processor nodes may also be configured to generate an image of the wafer using the different portions of the stored image data as described in commonly owned U.S. patent application Ser. No. 11/855,581 by Wu et al. filed Sep. 14, 2007, which is incorporated by reference as if fully set forth herein. Each of the embodiments described herein may be further configured as described in this patent application.

For visualization or display of the image of the wafer, the data to be visualized may be loaded onto the VI or on a network of computers connected to the VI. In addition, the system may be configured to display such an image on a display device (not shown) such that a user can view the image. The display device may include any suitable display device known in the art. The system may also be configured for visualization of an image of the entire wafer using all of the image data generated by scanning the wafer. Visualization of mass images (images generated using massive amounts of image data) of in-process semiconductor wafers (or reticles) recorded using an automated whole wafer imaging inspection system or other inspection system described herein can be a source of learning about the wafers as well as about the inspection system-wafer interaction. For example, a visualization tool may be used for image display and navigation on a VI, offline care area setup, overlay of data with the image of the wafer (e.g., floor plan, functional blocks, graphical data stream (GDS) design, noise maps, and other images such as images generated using other imaging modes), visualization of context map integration, visualization of highlighted pattern search results, visualization of design analyzer micro care area pattern search overlaid on GDS, visualization of micro care area overlaid on die, and visualization of a wafer parameter in a three-dimensional (3D) surface plot (possibly with zoom capability). The set of processor nodes may also be configured for visualization of terabyte-sized image data with zoom levels from the wafer level through the die level with resolution down to the pixel level. The set of processor nodes may be configured to generate a 3D image of the surface of the wafer and to display the image at different zoom levels as described in commonly owned U.S. patent application Ser. No. 11/837,204 by Cooper filed Aug. 10, 2007, which is incorporated by reference as if fully set forth herein. The embodiments described herein may be configured to perform any step(s) of any method(s) described in this patent application. The visualization may also be performed using a UI that allows a user to provide input for care area definition, image/design template submission, and input for a context map integrator, which is described further herein.

In some embodiments, the image generated from the stored image data may include a noise map. In some such embodiments, the image may be generated using the stored image data and a method such as one of those described in commonly owned U.S. patent application Ser. No. 11/673,150 by Kirk et al. filed Feb. 9, 2007, which published as U.S. Patent Application Publication No. 2008/0012083 on Jan. 17, 2008, Ser. No. 11/751,970 by Chen et al. filed May 22, 2007, which published as U.S. Patent Application Publication No. 2008/0018887 on Jan. 24, 2008, and Ser. No. 11/830,485 by Kulkarni et al. filed Jul. 30, 2007, which are incorporated by reference as if fully set forth herein. All of the embodiments described herein may be further configured as described in these patent applications. For example, the set of processor nodes or the VI column may be configured to perform any step(s) of any method(s) described in these patent applications.

In one embodiment, the wafer includes a patterned wafer. For example, the embodiments described herein can be used for image data generated for particularly complex patterned surfaces such as those found on semiconductor wafers. In addition, the embodiments described herein can be used to extend state-of-the-art complex patterned surface inspection systems by using persistent data to improve the sensitivity of surface inspection. The embodiments described herein can also be used to improve the ease of use of patterned surface inspection systems by allowing tuning of adjustable parameters of the inspection systems used during inspection without requiring re-scanning of the wafer. Furthermore, although the embodiments described herein are particularly advantageous for patterned wafers, the embodiments described herein are also advantageous for unpatterned wafers and other specimens described herein.

In some embodiments, the set of processor nodes is configured to use the image data stored in the arrays of the storage media to allow a user to navigate through an image of the entire wafer without using the physical wafer for navigation. The embodiments may also be configured to integrate two or more data sources for user navigation. For example, learning can be enhanced by convenient interactive, integrated, high speed, user-guided navigation of the mass images generated by the systems described herein with other data sources such as derivatives of the mass image data (e.g., image noise, detected defects, etc.), simulated images, reticle images, and detailed physical design data that was used to create patterns on the wafer or reticle. Navigation of the wafer image may be performed in any suitable manner. The set of processor nodes may also be configured to display an image of the wafer and/or to allow a user to navigate through an image of the wafer as described in commonly owned U.S. patent application Ser. No. 11/855,581 by Wu et al. filed Sep. 14, 2007, which is incorporated by reference as if fully set forth herein. Each of the embodiments described herein may be further configured as described in this patent application.

Since the set of processor nodes can allow a user to navigate through an image of the entire wafer without using the physical wafer for navigation, visualization and navigation can advantageously be performed without requiring use of the physical wafer, a stage, and optics. The alternative to navigating a full wafer image from disk is to navigate the actual wafer. A relevant example is the methodology used for physical failure analysis (FA) where the chip physical design is synchronized with the wafer stage so that the user can navigate from either the physical wafer or the design. Some obvious disadvantages of such wafer visualization are that the physical wafer is occupied and the instrumentation used is expensive. In contrast, using the embodiments described herein, the data to be visualized is all loaded onto the VI or on a network of computers connected to the VI thereby advantageously allowing other processes to be performed on the physical wafer and/or using the instrumentation.

In one embodiment, the set of processor nodes is configured to generate an image of the entire wafer using all of the image data generated by the detector during the scanning of the wafer that is stored in the arrays of the storage media, which may be performed as described further herein, and the set of processor nodes is configured to perform local image processing of the image and non-local image processing of the image. For example, as shown in step 24 of FIG. 2, the set of processor nodes may acquire image data, which may be performed as described herein. In one such example, the set of processor nodes may receive the image data from a detector or from another set of processor nodes coupled thereto. The set of processor nodes may store the image data as described further herein thereby creating VI storage layer 26. In addition, the set of processor nodes may be configured to use VI storage layer 26 in combination with prior scan data 28 and design data 30 to perform local and non-local image processing, as shown in step 32. However, the set of processor nodes may use VI storage layer 26 in combination with prior scan data 28 or design data 30 (e.g., depending on the type of image data processing or function that the set of processor nodes is performing such as detecting point defects, performing die stacking, detecting relatively large scale defects, searching for a process signature, etc.).

The results of local and/or non-local image processing may be used in a number of different manners (e.g., for detecting defects, for selecting one or more defect detection parameters, etc.). For example, the set of processor nodes may use results of the local and non-local image processing to select one or more parameters used for data acquisition and/or defect detection. The set of processor nodes may be configured to select the one or more parameters based on the results of the local and non-local image processing according to any of the embodiments described herein. The set of processor nodes may be configured to use the selected one or more parameters to acquire additional image data (e.g., by sending the one or more selected parameters to the inspection system with an instruction to acquire the image data), as shown by feedback loop 34 in FIG. 2. In addition, in one embodiment, the set of processor nodes is configured to perform processing of the image data stored in the arrays of the storage media and to use results of the processing to determine if additional image data for the wafer is to be acquired by scanning the wafer or from the arrays of the storage media. For example, the set of processor nodes may be configured to use results of the local and non-local image processing to determine if more data is to be acquired, as shown in step 33 in FIG. 2. If more data is to be acquired, then step 24 may be performed again to acquire more image data. In addition, the set of processor nodes may perform step 24, creating VI storage layer 26, and step 32 iteratively to iteratively improve the sensitivity of the inspection system. If in step 33, it is determined that more data is not to be acquired, the set of processor nodes may output results, as shown in step 35.

In this manner, the set of processor nodes have the ability to conditionally acquire more data or to generate results if no more scans of the wafer (or simulated scans using data stored on the VI) are required. For example, the set of processor nodes can acquire additional data conditionally based on processing data from one scan. In this manner, the embodiments described herein may be configured to perform conditional multi-pass defect detection. For example, the embodiments described herein may be configured to perform one scan of a wafer, analyze data from the scan, and then decide whether another scan should be performed on the wafer. In one such example, the wafer can be analyzed using one image mode and if the data analysis reveals some noise or defect signature in certain areas of the wafer, those areas could be scanned using another mode and the data analyzed before generating the final results. Other variants of this kind of conditional data acquisition and processing are possible.

Figure 2:
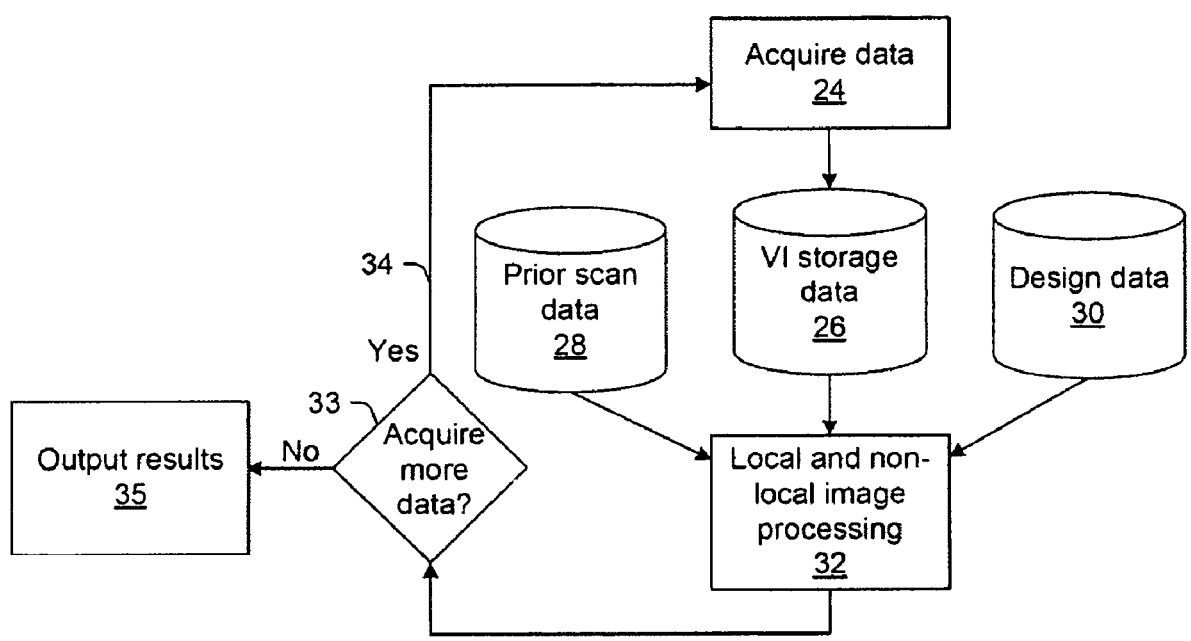
FIG. 2 is a flow chart illustrating one embodiment of image processing that may be performed by one or more system embodiments described herein.

The functions shown in FIG. 2 that may be performed by the set of processor nodes are different from functions performed by other inspection systems in a number of different manners. For example, some currently used inspection systems perform defect detection by acquiring image data, performing spatially local image processing, and generating a defect report (e.g., a KLARF). However, unlike the set of processor nodes described herein, such inspection systems are not capable of performing non-local image processing since the image data for a non-local area on the wafer is not stored by such systems (e.g., because they are incapable of storing relatively large amounts of image data generated by the systems). An example of non-local image processing is labeling different die regions into different region types based on their noise or die-to-die variability characteristics. Such labeling requires analyzing data from all parts of the die and wafer. Such labeling may be performed as described further herein. In addition, unlike the set of processor nodes described herein, such inspection systems are not capable of detecting defects using multiple streams of data (e.g., the stored image data, the prior scan image data, the design data, etc.). Therefore, the set of processor nodes described herein is advantageously capable of performing both local and non-local image processing and using multiple streams of data (e.g., prior scan image data, current scan image data, design data, etc.) for performing functions such as defect detection.

In another embodiment, the set of processor nodes is configured to generate an image of the wafer using the image data stored in the arrays of the storage media and at least one additional source of data for the wafer. In this manner, the set of processor nodes may be configured to perform multi-channel image fusion. The additional source(s) of data for the wafer may include any information that is available at the time of image fusion. Such data sources may include, but are not limited to, design data, a die context map generated offline using design layout, a die context map generated offline from image(s), defect detection results, defect detection results generated using image data generated by different detection channels of an inspection system, image data generated by multiple (different) scans of the wafer (e.g., multiple scans performed using different imaging modes of the inspection system), information about a reticle used to print patterns on the wafer, etc.

Multi-channel image fusion may not include simply overlaying multiple sources of data (although such overlay may also be performed by the systems described herein). Instead, multi-channel image fusion may include combining multiple sources of data to generate a composite image. Multi-channel image fusion may also be performed as described in commonly owned U.S. patent application Ser. No. 12/359,476 by Chen et al, filed Jan. 26, 2009, published as U.S. Patent Application Publication No. 2010/0188657 on Jul. 29, 2010 which is incorporated by reference as if fully set forth herein. Furthermore, as described above, the set of processor nodes may be configured to allow a user to navigate through a whole wafer image. Such images may include any of those described herein (e.g., images generated by multi-channel image fusion). As such, the embodiments described herein can be used for whole wafer image navigation with the potential to integrate design, defect, reticle, etc. image sources. Furthermore, the set of processor nodes may be configured to detect defects using the images generated by image fusion.

All of the images of the wafer generated according to any of the embodiments described herein using stored image data may also be stored in the arrays of the storage media or any other suitable storage media. For example, in one embodiment, the set of processor nodes is configured to archive images of the wafer acquired in multiple imaging modes of the inspection system. In this manner, whole wafer images generated from image data acquired using multiple imaging modes may be stored on disk. In addition, the embodiments described herein may be configured to perform one or more functions using the archived wafer images. For example, in one embodiment, the archived images can be used for mode selection for an inspection recipe. Such archived images may be used as described further herein to select one or more parameters (e.g., an optical mode) of an inspection system for inspection of wafers. In addition, the VI may be configured to perform mode selection for an inspection recipe using the archived images. Alternatively, the archived images may be provided to another system that is configured to perform mode selection for an inspection recipe using the images.

In addition, the set of processor nodes may be configured to perform archival of wafer images acquired using BF relatively small pixel inspection. For example, in one embodiment, the inspection system is configured as a BF small pixel inspection system, and the set of processor nodes is configured to archive images of wafers generated by the inspection system. A "small pixel" is defined herein as a pixel having a size that is less than about 100 nm. Such archived images may also be used to perform one or more applications described herein. For example, in one embodiment, the set of processor nodes is configured to perform offline image analysis of the image data stored in the arrays of the storage media to identify an inspection sample plan for another inspection system that has a lower throughput and higher resolution than the inspection system. Such offline image analysis may be performed using the archived BF relatively small pixel inspection images.

In one embodiment, the set of processor nodes is configured to tune an inspection recipe using the image data stored in the arrays of the storage media. For example, in one embodiment, the set of processor nodes is configured to select one or more defect detection parameters for inspection of the wafer using all of the image data or the selected portion of the image data generated by the detector during the scanning of the wafer that is stored in the arrays of the storage media. The one or more defect detection parameters may include any adjustable parameters of a defect detection method or algorithm (e.g., one or more thresholds). The one or more defect detection parameters may be selected using all of the image data or the selected portion of the image data according to any of the embodiments described herein. Therefore, unlike currently used methods and systems for defect detection parameter selection and/or tuning, which use only a relatively small amount of image data or image data for only a relatively small portion of the wafer, the embodiments described herein can perform defect detection parameter selection using the stored image data for the entire wafer or a substantial portion of the entire wafer. The use of such a substantial amount of image data can substantially improve selection of the defect detection parameter(s) (e.g., thereby producing more sensitive inspection recipes, inspection recipes that are more sensitive to defects of interest (DOI), inspection recipes that are more effective at suppressing noise, etc.).

In some embodiments, the set of processor nodes is configured to select one or more defect detection parameters for inspection of the wafer using the image data generated by the detector during the scanning of the wafer that is stored in the arrays of the storage media without requiring additional image data generated by performing additional scanning of the wafer. In this manner, the embodiments described herein enable algorithm tuning using stored data playback thereby freeing up valuable inspection system time that would otherwise be required to rescan the target wafers. In particular, the VI stores wafer images to disk for later playback without the need of a tool or the wafer. The wafer images can be scanned as if the wafer was loaded on the tool thereby allowing users to optimize recipes for a specific optics mode/light level. For example, the inspection system may only be necessary during the mode exploration phase of the recipe optimization process. Once the final mode is selected, the wafer may only be scanned one additional time to save the wafer image to disk. All final recipe optimization may be performed offline with the VI.

Since the set of processor nodes can select one or more defect detection parameters without requiring additional image data generated by performing additional scanning of the wafer, the set of processor nodes can perform offline parametric algorithm tuning. In this manner, the system may be configured for offline recipe setup. In particular, automated inspection system setup conventionally involves iterative inspection (including scanning) of a wafer. Image(s) on a VI can serve as a proxy for the actual wafer thereby relaxing the constraint of having wafer access or a full inspection system with stage and opto-mechanical subsystems. Once the mass image is stored, the user or the system can optimize detection algorithm settings because the VI can operate on the stored images rather than the physical wafer for which the images were acquired.

Using the stored image data for offline recipe setup, "new" defects can be detected by running new inspections without the physical wafer being needed. As such, offline recipe setup may include detecting new defects without the presence of a wafer and an inspection system. In this manner, the selection of one or more defect detection parameters can be performed without requiring additional scanning of the wafer and without being limited to those defects that were detected during inspection of the wafer. In particular, since the raw image data is stored, multiple defect detection algorithms can be applied to the raw image data during offline setup, and the multiple defect detection algorithms can be increased in sensitivity such that defects can not only be eliminated by adjusting the one or more defect detection parameters but can also be discovered by adjusting the one or more defect detection parameters.

One or more defect detection parameters may also be selected using the stored image data in combination with another stream of data. For example, the stored image data and another stream of data may be used to perform image fusion, and the one or more defect detection parameters may be selected based on the composite image generated by image fusion. In this manner, the sensitivity of a defect detection algorithm can be selected based on image fusion results. In addition, the sensitivity of multiple defect detection algorithms used for multi-pass defect detection, which may be performed as described further herein, can be selected using the image fusion results. Furthermore, combining offline setup with the concept of "virtual FA" described further herein enables the deterministic creation of inspection recipes that are selective to known "killer" defects.

One or more other parameters of an inspection recipe may also be selected as described herein using the stored image data. For example, one or more parameters of an inspection process that can be selected offline using the stored image data include, but are not limited to, care areas, which may be automatically setup using the stored image data, die size, and automatic geometry setup. In addition, for automatic sensitivity and/or defect detection algorithm setup, one step threshold setup (OSTS) and review information can be fed back to a relatively high resolution image system. Furthermore, the stored image data described herein can be used by the set of processor nodes or another system for developing new defect detection algorithms, qualifying new software, and verifying data integrity. For example, the VI may be used as a proxy for a full inspection system during the evaluation of advanced features targeted for integration on production inspection systems. Therefore, new feature characterization may be performed without using the inspection system for most features. As a proxy, the VI enables engineers to test new software on wafers and designs that would not typically be available at software development sites. In addition, for new platform and new software characterization, the VI allows much of the software specific features to be characterized without the need for tool time. In a similar manner, the VI can be used to characterize algorithms (e.g., defect detection algorithms). In addition, different algorithms being characterized may be compared using the same stored image data for the same wafer (i.e., in an "apples to apples" type comparison). Depending on the results of such projects, the functionalities may be integrated into inspection systems and potentially VI products.

Such offline recipe setup has a number of advantages over other methods for recipe setup. For example, in some currently used offline recipe setup methods, an offline simulator of the whole wafer inspection software is fed data from a substantially sensitive inspection and the user adjusts detection algorithm settings until a satisfactory filtering of nuisance defects is achieved. However, conventional inspection requires that the physical wafer be present for recipe optimization. With the VI, the user can continue performing defect detection on stored wafer image(s) while the physical wafer is made available for other operations. In particular, once the wafer image is stored, the VI can function in a stand-alone mode.

In addition, the recipe setup may not only be performed offline, but also may be performed at a location remote from the inspection system (e.g., outside of the fab, at another facility, at a facility of the inspection system manufacturer). For example, the stored image data may be sent to an applications engineer at an inspection system manufacturing site, which may be miles away, across the country, or in another country. Therefore, users of the inspection system may be assisted in inspection recipe setup by "an expert" regardless of the location of the expert.

In one such example, the inspection system may be configured to automatically send a signal to a remote applications team when a wafer needs a recipe. A customer best known method (BKM) may be used to generate and store the image data for the wafer. When the wafer arrives at the defect review system, a signal may be automatically sent to the remote applications team alerting the team that the wafer is ready for review and optimization. The remote applications team may optimize the recipe by reviewing defects on the wafer and saving the recipe back to the inspection system. If recipe improvement is needed, DOI identified by review may be tagged and the wafer may be sent back to the inspection system for optics selection and rescans.

Furthermore, the full impact of making offline changes to an inspection recipe cannot be assessed using previous setup methods because the user is constrained to considering a previously detected defect set. In particular, since the raw image data for the wafer is not saved, but is discarded after defect detection, the only defects that can be used for recipe setup are the ones that were detected during inspection. As such, the recipe cannot be made more sensitive, it can only be made less sensitive with the old methods. In particular, the only changes that can be made are to alter one or more defect detection parameters such that some of the previously detected defects are not detected.

The embodiments described herein also reduce the risk of damage to or contamination of wafers by preventing the need to perform multiple scans just to tune inspection algorithms.

For example, as described further above, the set of processor nodes can detect new defects on a wafer without using a wafer and an inspection system and therefore without exposing the wafer to additional radiation. In this manner, the embodiments described herein can prevent illumination-related damage to wafers. For example, modern wafer inspection systems use relatively high energy, relatively high intensity illumination sources that can actually modify the substrates that they are meant to inspect. Such modifications are particularly problematic when multiple scans are required during the iterative detection algorithm setting optimization process. Therefore, the user runs the risk that their work has modified the wafer. One example of such modifications is photoresist dimensions changing as a result of exposure to deep ultraviolet (DUV) light. The most common response in these situations is to limit the intensity or energy of the illumination. However, by tuning algorithm settings on stored image data for the wafer as described herein, this problem can be avoided. For example, the VI is particularly advantageous for recipe optimization for wafers that "burn" when exposed to UV light or when reviewed on a scanning electron microscope (SEM). For those layers, primarily after develop inspection (ADI) layers and back end of line (BEOL) etch layers, all likely modes can be saved at the start of the recipe optimization process. In this manner, the VI can be used to setup inspection recipes for resist-covered wafers to avoid burning of the wafers. Once wafer images are saved, SEM review burns become irrelevant to the recipe optimization process since images of the "pristine" wafer have been saved. As such, the user is not forced to compromise illumination energy or intensity used for scanning the wafer since once the wafer image data is stored on the VI, this operation is the same as offline setup or offline setup with review tool linkage. For example, as described further herein, the set of processor nodes may be configured to capture an image of the wafer on the VI. In addition, the set of processor nodes may be configured to optimize the recipe using the VI and perhaps a review system as described further herein.

In one embodiment, the set of processor nodes is configured to select one or more defect detection parameters for inspection of the wafer by identifying two or more different types of regions on the wafer using the image data stored in the arrays of the storage media and by separately determining the one or more defect detection parameters for the two or more different types of regions using the image data stored in the arrays of the storage media. For example, the embodiments described herein can be configured for using the stored image data for in-situ post-processing applications. In particular, the embodiments described herein can be used for in-situ post-processing at the wafer scale, which allows for powerful distributed post-processing of the stored data "in situ" (i.e., within the distributed node architecture) without having to pull (potentially) substantially large amounts of data out of the system (with its accompanying latency) and then performing the post-processing.

In this manner, the embodiments described herein can be used to exploit the storage media described herein to retain data across wafer scans in order to collect vast amounts of outlier and noise data that can be used for recipe tuning as described further herein without having to transfer large amounts of data between computing systems for analysis. In addition, the embodiments described herein for performing in-situ post-processing of vast amounts of data saved during recipe tuning can speed up recipe tuning and allow the system to exploit vast amounts of memory to store a larger amount of data for better defect detection parameter (e.g., threshold) determination.

Furthermore, any other applications described herein may also be performed by in-situ post-processing. For example, the ability to retain information in memory across scans and to provide a flexible software infrastructure for performing in-situ post-processing within the nodes will enable new applications like multi-scan defect detection for higher sensitivity, simultaneous die-to-die inspection for random defects coupled with die-to-sparse standard reference die inspection for systematic defect monitoring, wafer scale noise signature monitoring at wafer/lot levels, and quicker recipe setup through intelligent sampling.

One application of in-situ post-processing at the wafer scale is recipe setup and tuning thresholds to detect real defects and not nuisance or noise. Noise may be generated as a result of the imaging system (shot noise or residual misalignment noise) or process noise such as die-to-die variations due to film thickness variation, metal grain variation, variation in edge roughness, slight changes in optical focus, etc. Certain parts of a die by nature of their geometry are inherently more noisy (die-to-die variations) than others. It would be useful to classify the die surface into regions with (say) low, medium, and high noise levels so that a different detection threshold (offset) can be applied to pixels in each of these regions. Hence, a "noise" map may be generated for the whole wafer such that one can classify regions by comparing noise measures of the regions across all die on a wafer.

But noise-based region classification may be only the first step. After classifying the regions, "outliers" or pixels at which the die-to-die variation exceeds some threshold of noise for that type of region may be detected. To determine an appropriate threshold (or offset) for each region type, outliers may be located across the whole wafer, and then the most "prominent" outliers may be selected for review in order to set appropriate thresholds (e.g., such that the defect detection threshold may be selected using defect signals from largest to smallest thereby "working down from the top"). In this manner, the set of processor nodes may be configured to combine region labeling, initial threshold selection, and sample generation for recipe tuning using a single wafer scan. As such, the set of processor nodes may use a single wafer scan to combine noise data gathering and intelligent sampling of outliers for inspection recipe tuning. This concept can also be generalized to more than one scan (i.e., several hot scans can be run in different optical modes and events with a relatively high cross-correlation between two or more modes can be flagged) as described further herein. Of course, this implies that the storage may have to be shared between the patch images gathered in different nodes.

In one such embodiment, assume that eight nodes process one swath of data from a detector, i.e. each node processes ⅛ of a swath denoted as a sub-swath. Assume each sub-swath is made up of frames of image data abutting each other. A typical frame size may be about 512 pixels×about 512 pixels. Assume that several noise measures are computed using pixels in each frame. Assume that the nodes can together store N defects along with image patches surrounding each defect in their local memory.

Figure 3:
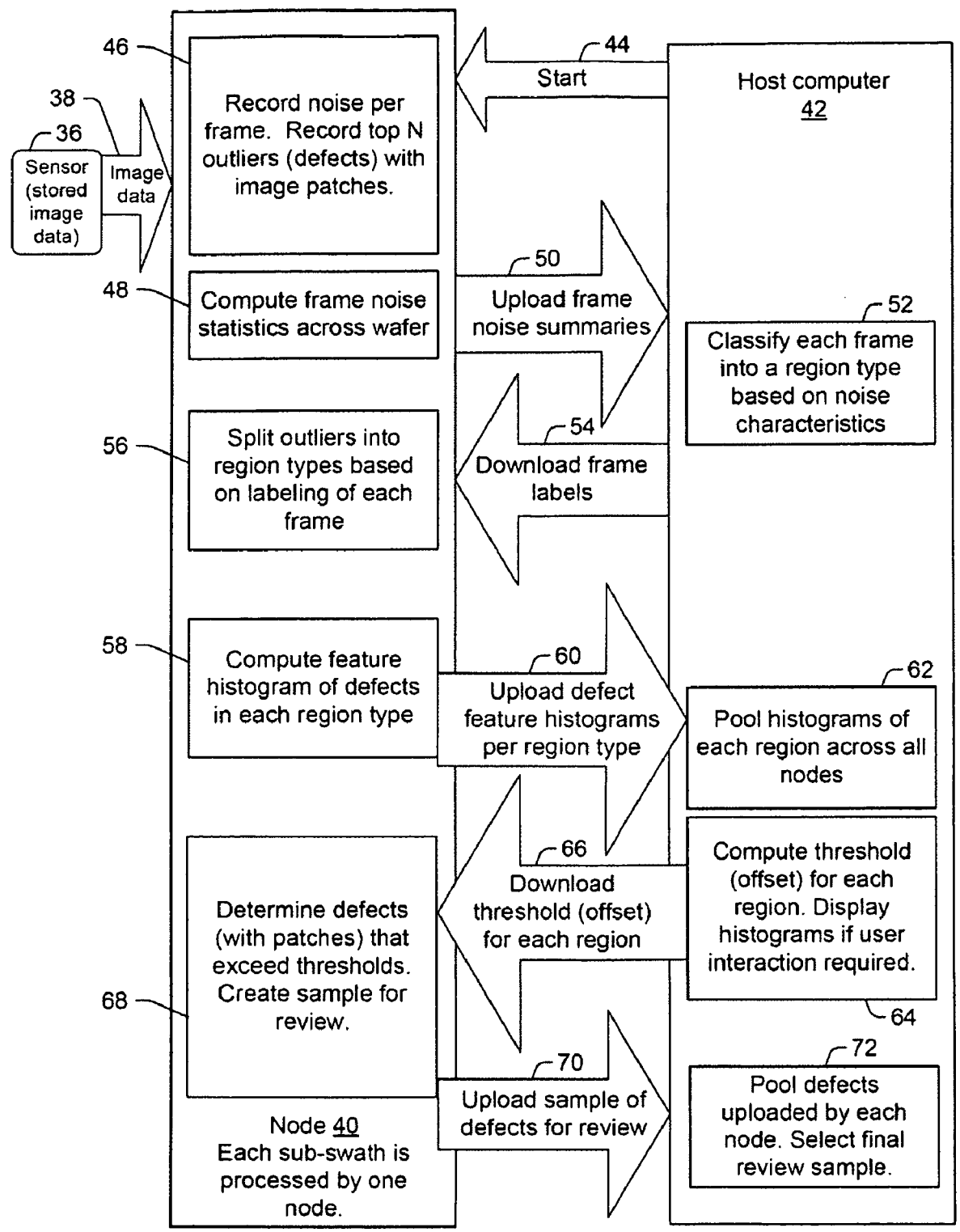
FIG. 3 is a flow chart illustrating one embodiment of a processing sequence for multi-scan defect detection that may be performed by one or more system embodiments described herein.

One embodiment of a processing sequence is shown in FIG. 3 in which the "host" computer directs certain functions to be executed on the nodes and substantially little of the total node memory data is actually sent to the host. In particular, the processing sequence shown in FIG. 3 is an in-situ post-processing sequence for region labeling (using noise) and threshold setting per region using outliers (defects), which may be used for recipe tuning. As shown in FIG. 3, sensor 36 may generate image data 38. Image data 38 may be sent to node 40, which may be one node in a set of nodes. Each sub-swath of the image data is processed by one node in the set. Therefore, the steps performed by the node shown in FIG. 3 may be performed by each node in the set. Node 40 and the set of nodes in which it is included may be further configured as described herein. Alternatively, the image data that is sent to node 40 may include stored image data, which may be stored on the VI as described further herein. In this manner, the method shown in FIG. 3 can be entirely performed by the VI using image data stored on the VI. In such embodiments, the VI may include the host computer described further herein, which may be coupled to each of the processor nodes in the VI column.

As shown in FIG. 3, upon receipt of image data 38, host computer 42 may send a start command 44 to node 40. Upon receipt of the image data and the start command, in step 46, node 40 records noise measures per frame. In addition, in step 46, node 40 records the top N outliers (defects) with patch images. In step 48, node 40 computes frame noise statistics across the wafer. In step 50, at the end of the wafer scan, node 40 uploads frame noise summaries to host computer 42. In step 52, host computer 42 labels each frame with a region type based on its noise characteristics. In step 54, host computer 42 downloads frame labels to node 40 (and each of the other nodes in the set).

In step 56, node 40 splits the outliers into region types based on labeling of each frame. In step 58, node 40 computes feature histograms of each region type's defects. In step 60, each node uploads defect feature histograms per region type to the host computer. In step 62, the host computer pools histograms of each region type across all nodes. In step 64, the host computer computes the threshold (offset) for each region type and displays histograms if user interaction is required. In step 66, the host computer downloads to each node the threshold (offset) for each region type.

In step 68, the node determines defects (with patches) that exceed thresholds and creates a sample for review. At the conclusion of this final step performed by the nodes, the defect patches and locations of the outliers that exceed the threshold/offset for each region type are sent to the host computer. For example, as shown in FIG. 3 in step 70, each node uploads a sample of defects for review. In step 72, the host computer pools the defects uploaded by each node and selects a final review sample. This final review sample can be further sampled to determine which defects will be reviewed on a review system such as a SEM. Final tuning of the thresholds can then be accomplished after defect review.

In some embodiments, the set of processor nodes is configured to generate an image of the entire wafer using all of the image data generated by the detector during scanning of the wafer that is stored in the arrays of the storage media, and the set of processor nodes is configured to send the image to a review system on which defects on the wafer are to be reviewed such that the image and output for the wafer generated by the review system can be used to select one or more defect detection parameters for inspection of the wafer using the image of the entire wafer and without requiring additional image data generated by the inspection system. In this manner, the system may be configured for offline recipe setup with review system linkage. The VI and the review system may be coupled by a high speed network such that the VI can send the image to the review system in an efficient manner.

The recipe setup process for optical whole wafer inspection systems often requires using a high resolution point-to-point imaging system (such as a SEM, focused ion beam (FIB), or atomic force microscope (AFM) review system). The process is frequently iterative, requiring the wafer(s) being used for setup to be moved back and forth between the inspection and review systems.

However, with the VI connected to the review system (e.g., via one or more transmission media such as a high speed network connection, which may include "wired" and/or "wireless" transmission media), the user can simultaneously access the "virtual wafer" in "optical space" (or an image of the wafer generated using stored image data that is acquired optically) while imaging the physical wafer on the review system. In addition, since the raw image data for the entire wafer can be stored and used to generate an image of the wafer, the image of the wafer that is displayed on the review system may appear as though the optical image is generated by the review system. For instance, the review system can be configured such that a user (or the review system) can navigate through the optical image of the wafer generated using the stored data (e.g., to view different portions of the optical image). In addition, detection algorithm settings can be applied iteratively to the generated optical image while observing the detected defects in "SEM space" where the physical wafer is located. In this manner, the optical image generated from the stored image data may be used to "drive" the defect review system to the locations of the defects to be reviewed. In addition, the review system can function as a VI by applying different defect detection algorithms to stored image data for the wafer and can function as a review tool using the physical wafer. As such, the review system may essentially function as two different tools, one of which is virtual. In addition, almost all of the inspection system capability/functionality may be available on the SEM. In this manner, the embodiments described herein may be used for review-inspection cycle optimization (RICO) using stored image data instead of image data acquired by repeated inspection of the wafer. In particular, the VI and a SEM can be used together for RICO for full recipe optimization (e.g., optimization of any parameters of the inspection recipe). In one such example, a computer system configured to perform RICO may be replaced by an inspection system UI with the mass storage described herein.

In addition, like offline recipe setup described above, using the stored image data during offline recipe setup with review system linkage, "new" defects can be detected by running new inspections without the physical wafer being needed. As such, offline recipe setup with review system linkage may include detecting new defects without using a wafer and an inspection system. In this manner, selection of one or more defect detection parameters can be performed without requiring additional scanning of the wafer and without being limited to those defects that were detected during inspection of the wafer. In particular, since the raw image data is stored, multiple defect detection algorithms can be applied to the raw image data during offline setup, and the multiple defect detection algorithms can be increased in sensitivity such that defects can not only be eliminated by adjusting the one or more defect detection parameters but can also be discovered by adjusting the one or more defect detection parameters.

In contrast, in currently used offline recipe setup with review system linkage, one approach to using a high resolution point to point review system for offline recipe optimization (with a simulator for the full wafer inspection system) is constrained to exploring defects that were detected on the inspection system prior to loading the wafer on the review system. However, the full impact of making offline changes to an inspection system recipe using a review tool cannot be assessed because the user is constrained to considering a previously detected defect set. For example, the recipe cannot be made more sensitive, it can only be made less sensitive with this method.

The embodiments described herein may also be used to compare results of one inspection recipe with results of another inspection recipe. The two inspection recipes may be completely different. In this manner, the embodiments described herein can conveniently and quickly evaluate the performance of two completely different inspection recipes. For example, the embodiments described herein can be used to compare signal-to-noise ratios (S/N) and yield relevance of defect Pareto charts (e.g., in which defect count is plotted as a function of design or region) from conventional inspection approaches to results attainable by applying context based inspection technology, which includes "micro care areas" (high count, high density, and high resolution care areas). Context based inspection technology may include any of the context based inspection methods and systems described in U.S. patent application Ser. No. 11/561,735 by Kulkarni et al. filed on Nov. 20, 2006, which published as U.S. Patent Application Publication No. 2007/0156379 on Jul. 5, 2007, and which is incorporated by reference as if fully set forth herein. In addition, the two inspection recipes may be compared using the same stored image data for the same wafer.

In one such example, the VI can be used for baseline testing for new software builds. Since baselines can be collected using the old and new software builds scanning the exact same wafer image, the baseline comparison can be as accurate as possible. In addition, a library of baseline wafers can be generated and used for baseline testing. Low capture rate defects would no longer be low capture since the wafer image is the same for both software builds. Also, contamination would no longer be an issue. In particular, wafers would not be required to remain in-house for the duration of the project.

The challenges of defect detection and defect data interpretation for inspecting advanced logic products on leading edge process technologies in the deep sub-wavelength regime have led to the exploration of the potential benefits of integrating design context at a much higher level of detail (e.g., using micro care areas) than is possible with conventional inspection technology. Since the VI can be used to generate and assess the benefits of micro care areas, the VI can be used to understand the value of micro care areas from design for production and development use cases.

Such comparisons may be performed for a number of different reasons and used for a number of different applications. For example, results of such comparisons may be used to improve the sensitivity of wafer inspection using advanced micro care area technology in combination with setup and detection applications compared to current sensitivity tuning and care area technology (manual and/or generated from design). In one such example, the VI may be used to identify the resolution and frequency of micro care areas required for providing substantive improvements in overall yield management methodology. The setup and detection applications may include design driven inspection or measurement for semiconductors using recipes as described in commonly owned U.S. Pat. No. 6,886,153 to Bevis, which is incorporated by reference as if fully set forth herein. The embodiments described herein may be configured to perform any step(s) of any method(s) described in this patent. The setup and detection applications may also include automated region based multi-threshold (RBMT), which may be performed as described in U.S. patent application Ser. No. 11/561,735 by Kulkarni et al. published as U.S. Patent Application Publication No. 2007/0156379 on Jul. 5, 2007, which is incorporated by reference above.

In addition, the setup and detection applications may include rule-based inspection (RBI), which is a detection scheme that includes multiple die auto-thresholding (MDAT) defect detection within an intelligent defect organizer (iDO). For example, in RBI, different thresholds can be set for different defect populations such that DOI can be inspected with a "hot" threshold while nuisance defects are inspected with a "cold" threshold. Therefore, RBI provides a breakthrough in inspection sensitivity by increasing the capture of relatively low signal killer defects and decreasing the capture of relatively high signal nuisance defects. For example, RBI can take advantage of an existing iDO framework by setting inspection thresholds/segmentation based on any iDO rule or combination of rules. These rules can be created from any attribute or feature vector (e.g., in the form of nearest neighbor nodes), including defect size, polarity, context, design information, etc. iDO is described in U.S. patent application Ser. No. 11/561,735 by Kulkarni et al. published as U.S. Patent Application Publication No. 2007/0156379 on Jul. 5, 2007, which is incorporated by reference above.

In one such example, defects may be separated based on one or more characteristics of the defects such as polarity (e.g., using iDO), and one threshold may be applied to one group of defects (e.g., the bright group of defects). One group of defects (e.g., the dark group of defects) may be further separated based on the pattern in which they are located, and different thresholds can be applied to defects in different patterns. MDAT may be used to determine the thresholds that are applied to each group of defects. In this manner, the defect population can be partitioned based on context and polarity, and a different threshold can be applied to each partition.

In addition, RBI has the ability to set different thresholds and/or segments or types of thresholds for defects that fit an arbitrary rule or rules based on any of the attributes or feature vectors of the defects that can be extracted by an inspection system. In particular, the threshold concept can be generalized to any algorithm that can be used to filter a subset of defect types and will be applied to only a subset of the defect population as described above. Furthermore, the threshold concept can be generalized to include attributes created or determined by any algorithm, even if that algorithm has optimal performance for only a subset of defect types. For example, energy is good for filtering nuisances due to color variation but poor for other nuisance types.

RBI is advantageous since killer DOI may have substantially low signals. Therefore, in currently used methods, lowering the threshold to capture such killer defects may result in substantially high nuisance rates. In particular, the highest signal defects are real defects, e.g., particles. As the threshold is lowered, a substantial number of nuisance defects are captured. As such, any significant capture of killer defects yields substantially high nuisance rates. However, RBI can be used to selectively apply lower thresholds in regions of the wafer in which killer defects with relatively low signals are located thereby increasing the sensitivity of the inspection without increasing the nuisance capture rates.

RBI is also advantageous since nuisance filtering can be performed on the set of processor nodes as the image data is received (e.g., from the detector of the inspection system or another column of processor nodes). In particular, the rules may be executed in a set of processor nodes (image computers), which may include any of the sets of processor nodes described herein. For example, the setup and detection applications may include nuisance event filtering (NEF) on a set of processor nodes ("Leaf image computers") (high capacity filtering capability during detection using defect attributes including region) setup techniques. In particular, iDO nuisance filters can be executed on a set of processor nodes (e.g., the VI column of processor nodes or another column of processor nodes) configured as described herein. In this manner, the nuisance events can be filtered as the image data is received by the set of processor nodes instead of after defect detection is completed. In particular, the defects can be classified as real or nuisance immediately after information such as defect attributes are available (e.g., as soon as the defects are detected). In one implementation, the detection algorithm and the nuisance filtering algorithm both work in the set of processor nodes, but they filter defects in two stages: detection first, then nuisance filtering. However, it is possible to have an implementation in which a single algorithm performs both functions.

Setting up RBI may include the following steps. A user runs a scan with a higher nuisance rate than the final target nuisance rate. A lot result is loaded in the iDO setup UI. An iDO classifier is created and thresholds/segments are set for different rules. Different thresholding techniques can be applied to different defect populations. For example, color defects in open areas can be filtered by energy while small signal-to-noise values (SNVs) in array regions are filtered by MDAT thresholds. An iDO classifier is exported. The iDO classifier is run on the inspection system as part of a normal inspection run.

Such nuisance filtering is advantageous for a number of reasons. For example, performing iDO NEF on the set of processor nodes increases the possibility of preserving real defects. In addition, moving iDO NEF from a host computer to the set of processor nodes results in no throughput impact. Instead, performing iDO NEF using the set of processor nodes advantageously improves throughput, reduces system bottlenecks, removes nuisance defects, reduces the size of lot results, and does not slow down inspection. In addition, throughput improvements obtainable using the set of processor nodes for nuisance filtering increase as the raw defect count increases. In contrast, performing nuisance filtering after defect detection slows the system performance particularly when the defect count is relatively high and the nuisance defect count is relatively high.

Furthermore, performing nuisance filtering on a set of processor nodes as described above allows nuisance filtering (e.g., iDO nuisance filtering) to take place without a throughput hit on the inspection or overloading the inspection system (e.g., "choking"). In addition, an added benefit of moving iDO NEF to the set of processor nodes is the ability to run the inspection even hotter than before when the maximum raw defect count was the limit. With iDO being performed by the set of processor nodes, the maximum defect count is equal to the defect count after iDO. In contrast, today thresholds are generally set according to two attributes: segmented autothresholding (SAT)/MDAT segment and region. All defects sharing a segment/region combination will have the same threshold even if other attributes separate them easily. Nuisance events have to be filtered, particularly since a wafer has many nuisance defects and few DOI, and iDO today provides the maximum versatility in ways to filter unwanted types. However, iDO will fail if it has to handle too many events. In particular, iDO cannot filter the defects if too many defects must be processed by iDO. Consequently, if defect counts are kept low, iDO can perform filtering. Therefore, capture of subtle DOI may be limited by the ability of the system to reject nuisance. As such, to catch all DOI, one must accept a substantial amount of nuisance defect detection.

Furthermore, previous methods used for nuisance filtering do not have the same performance as those described herein. In particular, in previously used methods, setting of thresholds/segments and nuisance filtering are performed in series: a threshold is set and fixed and only then are nuisance filtering rules set up. Furthermore, the nuisance filtering is performed by the host computer (not an image computer), which means that every defect must be passed on from the image computer to the host computer even if it will be later filtered out, greatly increasing the system load. Therefore, by setting and executing threshold/segments in series with nuisance filtering, recipes have to run colder (less sensitive) in order to avoid system choking. In addition, the same thresholding algorithm must be applied to the whole defect population even if different algorithms are optimal for some of the defect types, but not others.

Results of comparing such inspection recipes may also be used to improve the determined yield relevance of detected defects with detailed region labeling that enables direct mapping to relevant electrical information (e.g., scan chain id, cell name, cell instance id). Determining the yield relevance in this manner may be performed as described in U.S. patent application Ser. No. 11/561,735 by Kulkarni et al. published as U.S. Patent Application Publication No. 2007/0156379 on Jul. 5, 2007, which is incorporated by reference above. In addition, results of such comparisons may be used to assess how these capabilities can improve the effectiveness of yield modeling, root cause analysis, and defect or yield loss mechanism Pareto chart generation methodologies in combination with one or more of design-based binning (DBB), defect criticality index (DCI), direct defect location (DDL), and discrete defect review (DDR). DBB may be performed as described in the above-referenced patent application by Zafar et al. DCI may be determined as described in this same patent application. DDL is a method of locating defects detected by inspection during defect review, which is performed in an automated mode by e-beam review tools commercially available from KLA-Tencor, San Jose, Calif. DDR may be performed as described in commonly owned U.S. Patent Application Ser. Nos. 60/868,769 by Fouquet et al. filed Dec. 6, 2006 and 11/950,961 by Fouquet et al. filed Dec. 5, 2007 published as U.S. Patent Application Publication No. 2008/0163140 on Jul. 3, 2008, which are incorporated by reference as if fully set forth herein. Furthermore, the VI can be used to assess the value of detailed regions from design in conjunction with advanced detection methods (RBMT, RBI, NEF on Leaf) and advanced binning techniques (iDO, e.g., combining region, defect image context, DBB, and DCI attributes) and to consider defect or yield loss mechanism Pareto accuracy and yield relevance, time to excursion detection, diagnostic resolution of the data provided by the inspection and time to root cause identification.

In this manner, the VI can provide unique value in several areas of inspection performance based on engineering and production needs for modern semiconductor manufacturing environments. For example, micro care areas will enable more sensitive inspections with increased levels of setup automation and improved yield relevance by encoding detailed region-based a priori knowledge about a specific device design, known process interactions with certain parts of the device, and inspection system imaging mode interactions in specific regions of the device. In addition, micro care area technology will be at sufficient resolution to enable cumulative recipe optimization learning across devices. Micro care area technology will also simplify learning about design-process interactions at the cell library level across products for mechanisms detectable with optical inspection technology. Furthermore, the VI can provide value in nuisance reduction by filtering regions that are known a priori to be yield irrelevant image or Pareto chart noise sources.

The embodiments described herein may also be used for tool matching. For example, image-based tool matching may be performed by comparing the stored image data generated by two or more tools. In addition, the stored image data described herein can be used for troubleshooting potential problems with an inspection system. For example, the stored image data described herein can be sent from a customer site to the tool manufacturer such that the tool manufacturer can diagnose the tool performance. In this manner, the wafer images stored in the arrays of the storage media can be sent back to the tool manufacturer such that personnel at the tool manufacturer can help in difficult escalations.

The stored image data may also be used for other applications which can benefit from reduced tool usage and remote tool applications. For example, the stored image data described herein can be advantageously used to train users or potential users of the inspection system. In one such example, the stored image data can be used to emulate the inspection recipe setup process for a user in training without requiring the use of an actual wafer and the actual tool. In addition, the training may include any inspection system-related training such as training for new inspection systems and new inspection system features. Furthermore, a "student" can access stored image data at a desk via a remote connection to the VI to work on VI-based projects for learning such as hands-on "tool" experience, performing recipe optimization, learning the interaction between different algorithm parameters, experiencing the performance of different algorithms, learning when a wafer is signal-, noise-, or nuisance-limited, and becoming familiar with data analysis techniques.

Using the VI for training may be advantageous for the trainee in that tool issues do not slow progress on assignments and learning, prime tool time available (e.g., instructor available to answer questions in real time), and the VI increases efficiency (e.g., no time spent gowning-up, moving wafers, configuring the inspection system) and facilitates experiential learning (e.g., trainees can learn the effect of various algorithm parameters on inspection results and how they interact with each other). In addition, using the VI for training requires fewer tools and effectively allows more wafers to be used for training. Using the VI for training may be advantageous for a trainer in that specific use cases can be captured and designed to illustrate a point (e.g., value of one type of segmentation over another), inherently stable data allows objective evaluation of students (e.g., no adders or capture rate issues), and improved logistics (e.g., same wafer data can be used by multiple students, more people can be trained in a comfortable environment).

In another example, the VI allows storage of wafer images for important use cases discovered during other activities. For example, if a difficult layer was solved by using a unique methodology, that wafer image can be saved. With the wafer image saved, the lesson learned by the original layer owner can be taught to other applications engineers. Instead of reading a BKM or listening to a lecture, each engineer can relive the experience by inspecting the actual wafer image.

In addition, because the VI only requires the tool to save the original wafer image, substantially little tool time will be required for training. In fact, nearly all recipe optimization training can be moved off-tool. Moving such training off-tool will dramatically increase the effectiveness of applications training since engineers in-training will no longer have to compete for tool time.

Field applications training could also be revolutionized by the VI. For instance, by saving and documenting interesting wafer images and lessons, field applications engineers would have unprecedented access to the most interesting wafers and most valuable lessons. In addition, field applications engineers could access the VI remotely and complete the lessons from their home offices.

In another embodiment, the set of processor nodes is configured to detect defects on the wafer only after all of the image data or the selected portion of the image data generated by the detector during the scanning of the wafer is stored. For example, since all of the image data or the selected portion of the image data generated by the detector during the scanning of the wafer can be stored, defect detection no longer has to be performed during the scanning of the wafer or as the image data is acquired. In contrast, in currently used inspection systems, since the raw image data for the entire wafer is not stored, defect detection must be performed as the image data is acquired. In addition, although in some embodiments defect detection may not be performed until after all of the image data or the selected portion of the image data generated for the wafer is stored, defect detection may be performed as the data is acquired. In some such embodiments, the raw image data may be stored along with the results of defect detection.

In one such embodiment, defect detection is performed by applying a defect detection algorithm to the image data, and the defect detection algorithm is selected regardless of the speed at which the defect detection algorithm can be applied to the image data. For example, the stored image data may be used for post-processing of "expensive" (time consuming) defect detection algorithms. In this manner, the set of processor nodes may detect defects on the wafer by applying any defect detection algorithm to the stored image data regardless of the complexity of the defect detection algorithm. In contrast, since in currently used inspection systems a defect detection algorithm is applied to the raw image data as the raw image data is acquired, the defect detection algorithm must be applied to the raw image data at least as fast as the raw image data is acquired such that all of the raw image data can be used for defect detection (without loss of the raw image data). Therefore, currently used inspection systems are often limited to performing defect detection using defect detection algorithms that are relatively simple and can therefore be applied to the raw image data at a quick enough rate. However, since the embodiments described herein can store all or the selected portion of the raw image data generated for a wafer during scanning of the wafer, a defect detection algorithm can be selected and applied to the raw image data regardless of the complexity of the defect detection algorithm.

In another embodiment, the set of processor nodes is configured to detect defects on the wafer by applying two or more defect detection algorithms to the image data stored in the arrays of the storage media. In one such embodiment, the two or more defect detection algorithms are different in at least one parameter of the two or more algorithms. The parameter (s) of the two or more algorithms that are different may include any adjustable parameters of the algorithms. For example, the two or more defect detection algorithms may include two algorithms that are the same except for the value of a parameter of the algorithms (e.g., a threshold that may be applied to the stored image data to detect the defects). Alternatively, the two or more defect detection algorithms may include two completely different algorithms. For example, one of the defect detection algorithms may be a relatively simple defect detection algorithm, and the other defect detection algorithm may be a relatively complex defect detection algorithm. Applying two or more defect detection algorithms to the same stored image data may be advantageous for a number of different reasons such as detecting different types of defects in the stored image data. In a similar manner, the wafer can be "rescanned" by applying new or different algorithms, segmentation schemes, arbitration schemes, hotter thresholds, new WISE, rule based binning (RBB), "intelligent" automatic defect classification (iADC) filters, etc. to the stored image data. The two or more defect detection algorithms may be applied to the stored image data sequentially. In addition, the results of one of the defect detection algorithms may be used to determine if another algorithm is to be applied to the image data and if so which algorithm.

In some embodiments, the set of processor nodes is configured to detect defects on the wafer by processing the image data stored in the arrays of the storage media in multiple passes. In this manner, the set of processor nodes may be configured for multi-pass defect detection. In one such embodiment, one of the multiple passes includes identifying one or more portions of the image data corresponding to one or more regions of interest on the wafer. For example, the set of processor nodes may be configured to perform defect detection in a first pass in which regions of interest on the wafer are isolated using a relatively simple algorithm. The regions of interest on the wafer may be determined in the first pass based on statistical analysis (e.g., to look at the noise floor), which may be performed as described further herein. Therefore, the first pass of the defect detection may not actually include detecting defects on the wafer.

In another such embodiment, another of the multiple passes includes applying one or more algorithms to the image data to extract the defects and suppress detection of false defects. For example, the set of processor nodes may be configured to perform one or more subsequent passes of defect detection using complex algorithms for defect extraction and false defect detection minimization. In this manner, the proposed system architecture described herein in which data from a scan is retained in memory can improve defect sensitivity (and noise rejection) for multi-pass inspection.

The embodiments described herein also enable algorithms using multiple streams of stored data to improve sensitivity. For example, in one embodiment, the set of processor nodes is configured to detect defects on the wafer using multiple streams of image data stored in the arrays of the storage media. In this manner, the embodiments described herein can be used to exploit memory coupled to the processor nodes to retain data across wafer scans in order to improve defect detection without having to transfer substantially large amounts of data between computing systems for analysis.

In another embodiment, the set of processor nodes is configured to detect defects on the wafer using multiple streams of image data. In one such embodiment, one of the multiple streams includes the image data stored in the arrays of the storage media, and another of the multiple streams includes image data generated by the detector during additional scanning of the wafer. In some such embodiments, the scanning and the additional scanning of the wafer are performed with one or more different parameters of the inspection system. In this manner, the embodiments described herein can use stored image data (e.g., stored in the arrays of the storage media as described further herein) for multi-scan applications such as multi-scan defect detection. In addition, for multi-scan defect detection, the stored data may be read back, frame-by-frame, into the VI column from the arrays of the storage media, aligned and combined at the pixel level for defect detection. Alignment of the stored image data at the pixel level may be performed as described in the U.S. patent application Ser. No. 11/561,735 by Kulkarni et al. published as U.S. Patent Application Publication No. 2007/0156379 on Jul. 5, 2007, which is incorporated by reference above.

The one or more different parameters of the inspection system may include any adjustable parameter(s) of the inspection system. For example, one scan may be performed using one pixel size, and another scan may be performed using a different pixel size. Additional adjustable parameter(s) may include, but are not limited to, wavelength of illumination, angle of incidence of illumination, angle of collection, polarization of illumination, and polarization of collection.

In some such embodiments, defect detection may be performed using one stream of data generated by one scan of the wafer, and the defect detection results may be used to to determine if another stream of data generated by another scan of the wafer should also be used for defect detection. For example, defect detection may be performed using one stream of data generated by scanning the wafer with a first pixel size, and the defect detection results may be used to determine if another stream of data generated by another scan of the wafer using a different pixel size should also be used for defect detection. In some such examples, the defect detection results generated using the first stream of data may also be used to determine which areas of the wafer in which additional defect detection should be performed using the second stream of data.

In one embodiment, the set of processor nodes is configured to perform wafer inspection using a die context map stored in the arrays of the storage media for binning of defects detected during the wafer inspection and for determining sensitivity regions for the wafer inspection. For example, the embodiments described herein may be used for inspecting semiconductor devices using stored data obtained from either design information pertaining to the devices or image information derived from imaging the devices. This data can be used to inspect many wafers of the same type or the same wafer in multiple imaging modes without having to re-learn or re-acquire the data that has been stored. Such data may include, for example, a die context map that can be used and re-used for wafer inspection applications such as determining regions on the wafer that should be inspected with different sensitivity and/or for binning defects. Such context maps may be generated and the sensitivity for different regions on the wafer can be determined as described in commonly owned U.S. Patent Application Ser. No. 60/870,724 by Duffy et al. filed Dec. 19, 2006 and Ser. No. 11/960,157 by Duffy et al. filed Dec. 19, 2007, which are incorporated by reference as if fully set forth herein. The embodiments described herein may be configured to perform any step(s) of any method(s) described in these patent applications. In some embodiments, the set of processor nodes is configured for automatically determining sensitivity regions and recipe synthesis. For example, each design context may define a sensitivity region of a certain type for the inspection system. The system can scan a wafer, determine the noise floor for each context, and create a context-to-noise threshold table. A new device recipe can also be automatically created using the context-to-noise mapping determined for the first device.

In one embodiment, the set of processor nodes is configured to generate a die context map using image processing algorithms to process a wafer image previously stored in the arrays of the storage media and to store the die context map in the arrays of the storage media. For example, the image data stored as described herein may be used to generate a context map. For instance, a die context map can be generally defined as a mapping of die regions to a set of labels (types), which can be used for improved defect binning, improved nuisance filtering, improved selective detection sensitivity, yield analysis, or some combination thereof. The granularity of the context map can be at the pixel level (e.g., on the order of the design rule, a 3 pixel by 3 pixel grid, etc.) or at a coarse level (e.g., a 1 micron by 1 micron grid).

Some examples of context map generation methods include performing an image scan on a high resolution tool (e.g. an e-beam or BF inspection system) and scene segmentation based on geometrical and textural features or template matching. Scene segmentation can be totally automatic (unsupervised). In addition, context map generation may be performed as described above, but segmentation may be based on analysis of die-to-die variability. In another example, context map generation may be performed using a combination of the two above-described methods. In a further example, context map generation may be performed using design layout analysis (e.g., polygonal matching and cell hierarchy encoding).

Image-based context map generation using a VI may include the following steps. For example, the method may include scanning die(s) using an inspection system and storing data to a disk array (e.g., using the VI architecture described further herein). In addition, the method may include playing back the stored image and using a multiprocessor system (e.g., the VI column) to run image processing algorithms to create a context map on a stand-alone VI system. The generated map may be saved on a RAID disk for use at runtime on an inspection system.

In one embodiment, the set of processor nodes is configured to generate a die context map from design layout generated offline and to store the resulting die context map in the arrays of the storage media. For example, design-based context map generation using a VI may include the following steps. The design layout is split into "virtual swaths" corresponding to the manner in which the die is scanned on the inspector. The design file for each swath is processed on a separate computer (node) to generate a context map using suitable algorithms for classifying different types of geometry. The generated map is saved on a RAID disk for use at runtime on the inspection system.

The context map may also be generated from design upstream and/or in the fab. For example, one source of context can be generated in an electronic design automation (EDA) reference flow in which upstream design GDS is analyzed using a scripting language to identify potential critical geometries or regions on a die. In one such example, a yield engineer may create a context map from design. An additional source of context may be a context map from hotspot data in which design rule checking (DRC) tools are used to create a hotspot and/or care area GDS file.

A context map may also be generated on the VI using a combination of image processing algorithms as described above and geometrical analysis algorithms utilizing design data, and both types of data (image data and design geometry data) may be distributed on the arrays of the storage media on the VI.

Context maps can be used by the embodiments described herein in a number of manners. For example, the context maps can be used for frequency analysis of contexts, defect-context affinity measures, describing systematic defect mechanisms, speeding up DBB, and automatic recipe synthesis for new devices. Additional use cases for context maps include hyper-sensitivity (e.g., enhanced sensitivity in selected micro-regions), de-sensitivity (e.g., reduce nuisance and/or create automatic do not care micro-regions), runtime context binning (e.g., find defects with repeating backgrounds), offline waferless setup (e.g., calibration to correlate design to image signal-to-noise characteristics), and systematic defect detection (e.g., using standard reference die, GDS hierarchy, repeating context). A context map may be further generated and used as described in commonly owned U.S. patent application Ser. Nos. 11/561,735 by Kulkarni et al. published as U.S. Patent Application Publication No. 2007/0156379 on Jul. 5, 2007 and 11/561,659 by Zafar et al. published as U.S. Patent Application Publication No. 2007/0288219 on Dec. 13, 2007, both of which were filed on Nov. 20, 2006, and both of which are incorporated by reference as if fully set forth herein. In addition, DBB using a context map may be performed as described in these patent applications. Furthermore, the embodiments described herein may be configured to perform any step(s) described in these patent applications.

In this manner, the embodiments described herein can be used to achieve a higher sensitivity to detecting all types of defects using multiple scans of a wafer and to combine information from all of the scans at a substantially fine level of detail before making a decision on whether a defect is real or a nuisance. For example, the embodiments described herein may use the concept of node memory to store patch images gathered across two or more hot scans in order to improve defect detection.

In addition, stored image data acquired by scanning a wafer two or more times using one or more different values for an optical parameter of the inspection system may be used to select one or more optical parameters for use in inspection of the wafer or the same layer on additional wafers. For example, a wafer may be scanned using several (e.g., two or more) different optical modes. The image data generated by each of the scans may be stored by the system embodiments described herein. This stored image data may then be used to determine which of the optical modes is "best" for inspection of the wafer and the same layer on additional wafers. The "best" optical mode may be the optical mode that produces the best score, e.g., the highest S/N for DOI. The scores for the different optical modes may be determined as described in commonly owned U.S. patent application Ser. No. 13/148,473 by Lee et al., filed Aug. 8, 2011 which is incorporated by reference as if fully set forth herein. The embodiments described herein may also be configured to perform one or more steps of one or more methods described in this patent application.

The optical mode that is determined to be the "best" using stored image data generated by multiple scans of the wafer may not be one of the optical modes used for the scans. For instance, the stored image data may be used in combination with other data sources such as empirical knowledge and information about the wafer itself to determine that one of the optical modes can be altered in some manner (e.g., by changing an aperture) to make the optical mode better and therefore perhaps the best for inspection of the wafer.

The stored image data generated by one or more scans of the wafer may also be used for selecting one or more optical parameters of the inspection process for the wafer as well as one or more defect detection parameters of the inspection process. The stored image data may, therefore, be used to perform whole inspection recipe creation. Selecting the one or more optical parameters and the one or more defect detection parameters may be performed sequentially or simultaneously. Selecting the one or more optical parameters and the one or more defect detection parameters for an inspection recipe may be performed offline as described further herein, which can reduce the time in which the inspection system is being used for recipe creation or tuning by a factor of 10 or more.

The VI architecture can be used to simulate multi-pass defect detection. For instance, assume that data from a given wafer produced using two different imaging modes has been recorded onto the disk array of the VI. Assume that a certain amount of memory (with a capacity to hold data for N defects) in each node is dedicated for multi-scan defect detection and that there are 8 nodes processing one swath of data from the detector. A "hot" defect detection recipe may be used to process the data recorded in one imaging mode, and the "top" N defect candidates (e.g., the defects with the biggest signal, the defects having the largest size(s), etc.) detected by each node may be stored and thus information can be retained for 8N defect candidates. Next, one can play back the data recorded in the second imaging mode and execute a hot recipe on this data stream. As the defect candidates in this data stream are identified, their locations are compared with the locations of the stored defect candidates from the first simulated scan. If they do not coincide, the candidate is ignored. If the locations coincide (to within some tolerance, say +/−2 pixels), then a correlation is computed between the signal from the pixels in the two patches. Since noise typically will not correlate across different imaging modes, the effect of this correlation is to suppress noise and enhance the defect signal. If this peak correlation exceeds some threshold, that defect is retained, otherwise it is discarded. The effect of this type of filtering is that substantially hot scans can be run in each mode, and location coincidence and image correlation can both be used to identify real defects. A possible modification of this approach is to retain not only the defect patch images where the correlation is relatively high across the two modes but also the patch images in each mode where the signal strength was higher than a certain threshold, even if the other mode did not catch this event.

Figure 4:
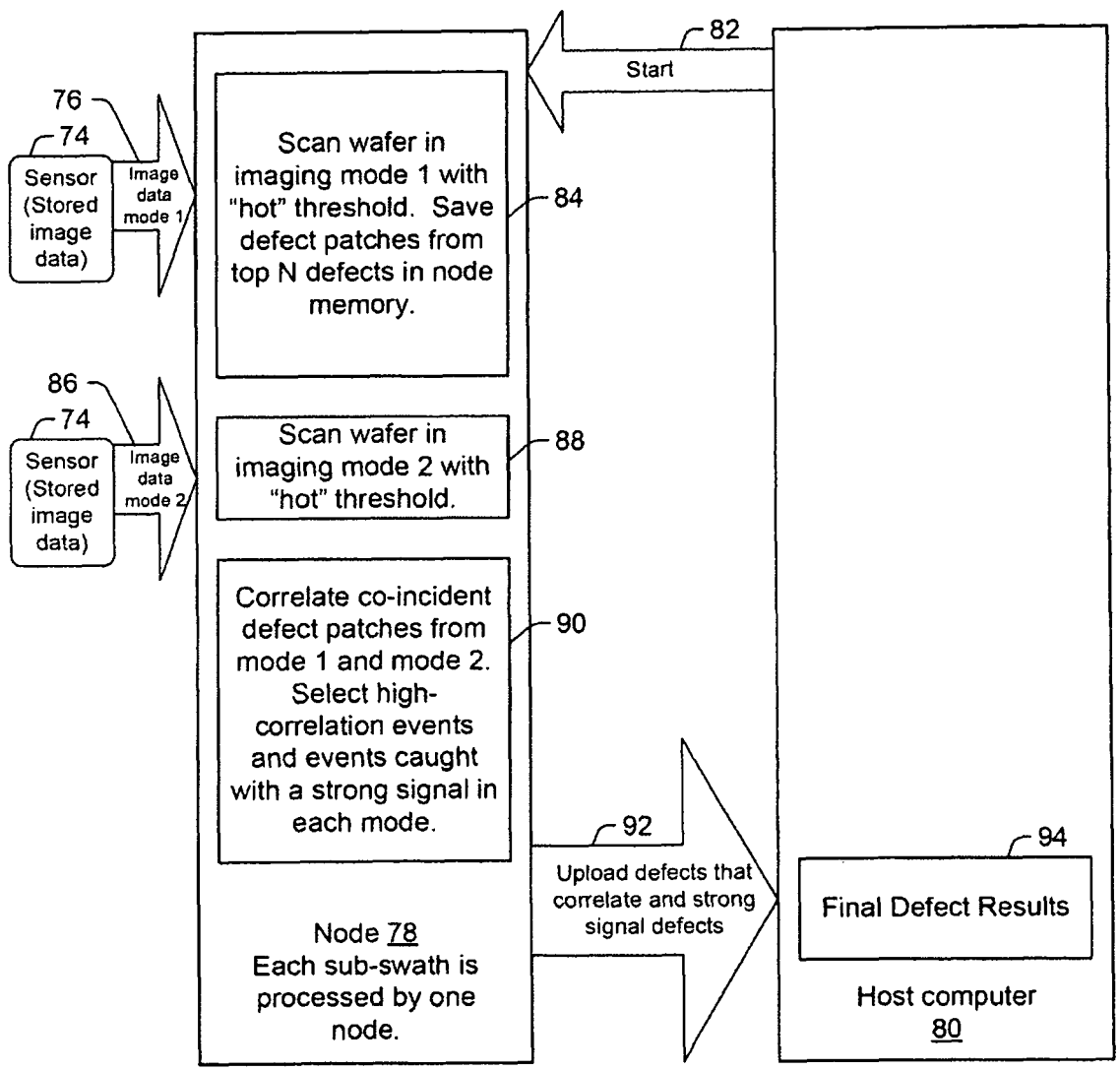
FIG. 4 is a flow chart illustrating one embodiment of an in-situ post-processing sequence for region labeling (using noise) and threshold setting per region using outliers (defects), which may be used for inspection recipe tuning, and which may be performed by one or more system embodiments described herein.

FIG. 4 shows one embodiment of a processing sequence for multi-scan (two hot scans) inspection or multi-pass defect detection. As shown in FIG. 4, sensor 74 generates image data 76 using mode 1. Image data generated using mode 1 is sent to node 78, which may be one of a set of nodes, and each sub-swath of image data may be processed by one node. Node 78 and the set of nodes in which it is included may be further configured as described herein. Alternatively, the image data generated using mode 1 that is sent to node 78 may be stored image data, which may be stored as described further herein and played back to the node. Host computer 80 may also be included in the VI and coupled to each of the processor nodes in the VI as described further herein.

Upon receipt of image data 76 generated using mode 1, host computer 80 sends start command 82 to node 78. Upon receipt of the start command, in step 84, the node scans the wafer in imaging mode 1 with a "hot" threshold and saves defect patches from the top N defects in storage media coupled thereto.

Sensor 74 also generates image data 86 using mode 2. Image data generated using mode 2 is sent to node 78. Alternatively, the image data generated using mode 2 that is sent to node 78 may be stored image data, which may be stored as described further herein and played back to the node. In step 88, the node scans the wafer in imaging mode 2 with a "hot" threshold. In step 90, the node correlates coincident defect patches from mode 1 and mode 2 and selects high correlation events and events caught with a relatively strong signal in each mode. In step 92, the node uploads defects that correlate and relatively strong signal defects to host computer 80, which stores the uploaded defects from each node as final defect results 94.

The embodiments described herein for multi-scan defect detection have a number of advantages over other methods currently used for multi-scan defect detection. For instance, one method currently used for multi-scan defect detection uses two or more cold scans and the "union" of all defects as the final results of inspection. This method for multi-scan defect detection has a number of disadvantages. For example, the current multi-scan method must run each scan fairly cold (e.g., using a threshold for defect detection that is substantially higher than the noise floor of the image data generated by the detector during scanning of the wafer) in order to not catch nuisance defects and does not make use of multi-channel data at the pixel level thereby not achieving the maximum sensitivity and noise suppression possible with the methods described herein.

In some embodiments, the set of processor nodes is configured to detect defects on the wafer using multiple streams of data, and the multiple streams include the image data stored in the arrays of the storage media, statistical data for the wafer, and design data for the wafer. In this manner, the set of processor nodes may be configured for detecting defects on a wafer using one or more algorithms into which statistical data and design data are incorporated. The statistical data and the design data for the wafer may be stored in the arrays of the storage media described herein or stored in one or more different storage media. In addition, the statistical data and the design data may be fractured in the same manner as the image data that is stored in the arrays of the storage media thereby making alignment of the multiple streams of the data to each other easier. Alignment of multiple streams of data may be performed in any suitable manner.

In one such embodiment, the design data may be used to determine which areas of the wafer are critical and which are not-critical, and the criticality of the different areas of the wafer may be used to determine which thresholds or defect detection algorithms are to be applied to the image data corresponding to the different areas of the wafer. The design data may also include design data for one or more layers of the wafer. Using multi-layer design data for defect detection may be further performed as described in commonly owned U.S. patent application Ser. No. 11/561,735 by Kulkarni et al. published as U.S. Patent Application Publication No. 2007/0156279 on Jul. 5, 2007 and Ser. No. 11/561,659 by Zafar et al. published as U.S. Patent Application Publication No. 2007/0288219 on Dec. 13, 2007, both of which were filed on Nov. 20, 2006, and both of which are incorporated by reference as if fully set forth herein. In another embodiment, the statistical data (e.g., noise, any other statistical data described herein, or any data determined in a statistical manner using the image data generated for the wafer and/or stored in the arrays of the storage media) may be used to determine which areas of the wafer are particularly noisy and which areas of the wafer are not particularly noisy, and the noise levels of the different areas of the wafer may be used to determine which thresholds or defect detection algorithms are to be applied to the image data corresponding to the different areas.

In an additional embodiment, the set of processor nodes is configured to detect defects on the wafer using multiple streams of data, one of the multiple streams includes the image data stored in the arrays of the storage media, and another of the multiple streams includes data not acquired by the inspection system. In this manner, the embodiments described herein enable the use of data not acquired by the inspection system (e.g., design data) as a data stream to improve algorithm sensitivity. The data not acquired by the inspection system may include, for example, design data, which may be used for defect detection as described further herein. In another example, the data not acquired by the inspection system may include data acquired by another system such as an electron beam tool if the inspection system is an optical tool or an optical tool if the inspection system is an electron beam tool. For example, while some optical inspection systems (e.g., BF tools) may produce image data that is responsive to layers under the uppermost layer of the wafer, electron beam inspection systems will only produce image data that is responsive to the uppermost layer of the wafer (e.g., any underlying layers will be "invisible" to the electron beam inspection systems). Therefore, image data not acquired by the inspection system may be used with image data acquired by the inspection system such that image data from multiple layers may be used to more accurately determine one or more parameters of a defect detection algorithm (e.g., by determining criticality based on patterns formed on more than one layer of the wafer or by reducing the complexity of determining the criticality by using the image data to separate image data for one layer of the wafer from an underlying layer of the wafer).

In one embodiment, the set of processor nodes is configured to detect defects on the wafer using the image data stored in the arrays of the storage media by comparing a portion of the image data corresponding to a die on the wafer to another portion of the image data corresponding to a different die on the wafer. In one such embodiment, the portion of the image data and the other portion of the image data are included in a single stream of image data. In this manner, the set of processor nodes may be configured to detect defects on the wafer using die-to-die type comparisons. The portions of the image data that are compared to each other may include image data included in a single stream of image data.

In a further embodiment, the set of processor nodes is configured to detect defects on the wafer using the image data stored in the arrays of the storage media by comparing a portion of the image data corresponding to a die on the wafer to a standard reference die and by comparing a different portion of the image data corresponding to the die on the wafer to a corresponding portion of the image data corresponding to a different die on the wafer. In this manner, the embodiments described herein may be configured for "die-to-sparse standard reference die detection." For instance, die-to-sparse standard reference die inspection may be performed at pre-defined locations by saving patch images from a scan of the standard reference die at selected locations (e.g., potential repeater or systematic defect locations) and using these patch images to compare with corresponding locations on a test die while performing die-to-adjacent die inspections at other locations. In particular, the set of processor nodes may be configured to concurrently (in the same scan) perform random defect detection using die-to-adjacent die comparison and perform systematic defect monitoring using die-to-stored standard reference patch images from pre-selected areas. The pre-selected areas for which die-to-stored standard reference patch images may be used for defect detection may, therefore, include areas of the die that may present special cases or areas of particular interest (e.g., areas that include locations of potential systematic defects). In addition, the pre-selected areas for which the die-to-stored standard reference die comparison is used may be a relatively small area of the die (e.g., about 1% of the pixels), and as such, the amount of memory needed to store the sparse standard reference die may be relatively small compared to that required for a standard reference image for the entire die.

The standard reference die may be generated in any suitable manner. In one embodiment, the set of processor nodes is configured to generate a standard reference die using image data for two or more dies on one or more wafers and to store the standard reference die in the arrays of the storage media. For example, the standard reference die may be generated using data acquired for several dies on a wafer. Examples of methods for generating such a standard reference die are described in commonly owned U.S. Patent Application Ser. No. 60/950,974 by Bhaskar et al. filed Jul. 20, 2007 and Ser. No. 12/176,095 by Bhaskar et al. filed Jul. 18, 2008, which is incorporated by reference as if fully set forth herein. The embodiments described herein may be configured to perform any step(s) of any method(s) described in these patent applications.

In addition, although the embodiments described herein may be configured to perform die-to-sparse standard reference die defect detection in which only a portion of a die on the wafer is compared to a standard reference die, the embodiments described herein may also or alternatively be configured to compare an entire die to a standard reference die for defect detection. For example, in one embodiment, the set of processor nodes is configured to perform wafer inspection by comparing image data corresponding to a die on the wafer to a standard reference die, and the image data corresponding to the die on the wafer and the standard reference die are stored in the arrays of the storage media. Therefore, the VI may be configured to perform die-to-standard reference die inspection offline. In another embodiment, the set of processor nodes is configured to perform wafer inspection by comparing a standard reference die stored in the arrays of the storage media to image data corresponding to a die on the wafer as the image data corresponding to the die is received from the detector. Therefore, the VI may be configured to perform die-to-standard reference die inspection online (as the image data is generated using a physical wafer). For example, during die-to-standard reference die wafer inspection, the VI can pull both streams in together, the stream of data for the wafer and the standard reference die. In this manner, as the data is streaming in from the inspection system, the streaming data can be compared to a stored standard reference die on the VI.

In some such embodiments for die-to-sparse standard reference die defect detection, the method shown in FIG. 4 can be generalized to a case in which we capture (within a node) patch images from a known good die from a known good reference wafer and then use these patch images to compare the corresponding regions on all die of a test wafer being inspected. The number of standard reference patch images that can be saved depends on the memory capacity per inspection system node, the patch image size saved (e.g., 128 pixels by 128 pixels), and the geographical distribution of the standard reference patch images since each node receives a fraction of the die area. For example, certain locations on a test wafer can be inspected against the standard reference die to detect repeater or systematic defect mechanisms while die-to-adjacent die defect detection methods can be used for the rest of the wafer.

In some embodiments, the set of processor nodes is configured to compare the image data for the wafer stored in the arrays of the storage media with image data for another wafer. In one such embodiment, the set of processor nodes is configured to store image data for two full wafers on the VI. The set of processor nodes may then designate one wafer as the test wafer and the other as the reference wafer. In one such example, a test die on a test wafer may be compared to a stored standard reference die on a reference wafer to detect defects on the test die. A reference die on the reference wafer may also be compared to the stored standard reference die to detect defects on the reference die. The reference die and the test die may be located in corresponding areas on the two wafers (e.g., the reference die and the test die may have substantially the same coordinates on the two wafers). The defects detected on the test die may also be compared with defects detected on the reference die. The set of processor nodes may also be configured to manage the issues related to having multiple references per test die for defect arbitration (i.e., to determine which wafer or which portion of a wafer on which the defect is located).

In another such embodiment, the set of processor nodes is configured to store a reference wafer on the VI. The set of processor nodes may also be configured to connect the VI to a "real" inspection system and to feed the reference data from the VI to the real inspection system during the inspection process. The reference data may be fed from the VI to the real inspection system at substantially the same rate at which the real inspection system acquires the test data. However, the reference data may be fed from the VI to the real inspection system at a rate that is different than that at which the test data is acquired (e.g., some of the reference data or test data can be buffered or the reference data and the test data may be acquired at different resolutions and may therefore be fed to the real inspection system at different rates).

In this manner, the set of processor nodes may be configured for inter-wafer comparisons. Once the wafer images are loaded, a wafer-to-wafer comparison may be performed either on a single VI, two VI connected to each other, or a VI connected to a real inspection system. As such, the embodiments described herein can exploit the storage media described herein to retain data across wafer scans to monitor wafer signatures at a substantially fine level of detail without having to transfer substantially large amounts of data between computing systems for analysis.

For example, in one embodiment, the set of processor nodes is configured to perform wafer property signature analysis using the image data stored in the arrays of the storage media. In particular, the proposed architecture for wafer noise monitoring exploits stored image data between scans to record and monitor noise at a substantially fine level of detail (wafer/die/frame/region) without being limited by the image computer system I/O bandwidth limitations. For example, wafer-to-wafer comparisons that may be performed by the embodiments described herein allow for comparing one wafer with another at a much greater level of detail than merely comparing defect maps of different wafers. In particular, properties of each frame of each die can be compared across two wafers or between a test wafer and a reference wafer to allow for the detection of wafer-wide signatures that may be used to identify systematic defect mechanisms in the wafer fabrication process. In addition, the properties of each frame may be determined as a function of design context. For example, difference statistics per frame per design context may be determined for the results of a test die-to-stored standard reference die comparison and for a reference die-to-stored standard reference die comparison. These frame statistics may then be compared to compare the test wafer to the reference wafer. In this manner, the set of processor nodes may be configured to identify and/or analyze a signature in a wafer property to identify systematic defects. The set of processor nodes may also be configured to identify and/or analyze a signature in a wafer property to detect macro-level defects. Wafer-to-wafer comparisons may also be performed by the embodiments described herein as described in commonly owned U.S. patent application Ser. No. 11/561,735 by Kulkarni et al. published as U.S. Patent Application Publication No. 2007/0156379 on Jul. 5, 2007 and Ser. No. 11/561,659 by Zafar et al. published as U.S. Patent Application Publication No. 2007/0288219 on Dec. 13, 2007, both of which were filed on Nov. 20, 2006, and both of which are incorporated by reference as if fully set forth herein.

In addition, the set of processor nodes may be configured to monitor noise across wafers. In this manner, the set of processor nodes may be configured to perform wafer noise floor process monitoring. For example, the set of processor nodes may be configured to monitor wafer noise per die/frame/micro-region within frame from one wafer to another and report only the anomalies to the host system. In this manner, only anomalous events from noise monitoring may be reported to the host computer. Therefore, there is no need to send vast amounts of noise data outside the system for analysis in order to determine anomalous events.

The set of processor nodes may be further configured to monitor the wafer noise floor as described in commonly owned U.S. patent application Ser. No. 11/830,485 by Kulkarni et al. filed Jul. 30, 2007, which published as U.S. Patent Application Publication No. 2007/0156379 on Jul. 5, 2007, and which is incorporated by reference as if fully set forth herein. The set of processor nodes may also be configured to perform any step(s) of any method(s) described in this patent application. In addition, such noise floor monitoring can help a user track wafer process variation. Such noise floor monitoring can also assist in defect review sampling (e.g., SEM sampling). For example, distinct high noise regions may indicate a systematic defect mechanism and may therefore be selected for defect review sampling.

In some embodiments, wafer-to-wafer comparison is substantially similar to the noise measure mentioned in the above recipe setup use case (in-situ post-processing at the wafer scale). The purpose here is to compare the noise in each gray level interval (say 16 intervals) in each region type (say 3 region types with low, medium, and high noise levels) for every frame of data on the wafer. Thus, one can scan a "reference wafer" and keep its noise map in memory. Moreover, a "stacked die" summary of each die/frame/region across all dies on the reference wafer can also be kept in the storage media coupled to each node for the die frames that the node inspects (see FIG. 5 described further below). As each test wafer is scanned, the noise/property of each die/frame/region is extracted and compared to the reference wafer value. Similarly, a stacked die summary is generated at the end of each test wafer. The wafer-wide and stacked die summaries are compared with the reference values, and anomalies are reported to the host computer at the end of each test wafer scan. The node also records the trends (rate of change from the last wafer) and summary of previous N wafers for every die/frame/region. At the end of a lot or several lots, the nodes can report anomalies based on trends recorded for each die/frame/region on the wafers. This step is analogous to the idea of defect detection in which only a few thousand outliers from the sea of pixels is reported as "results."

Figure 5:
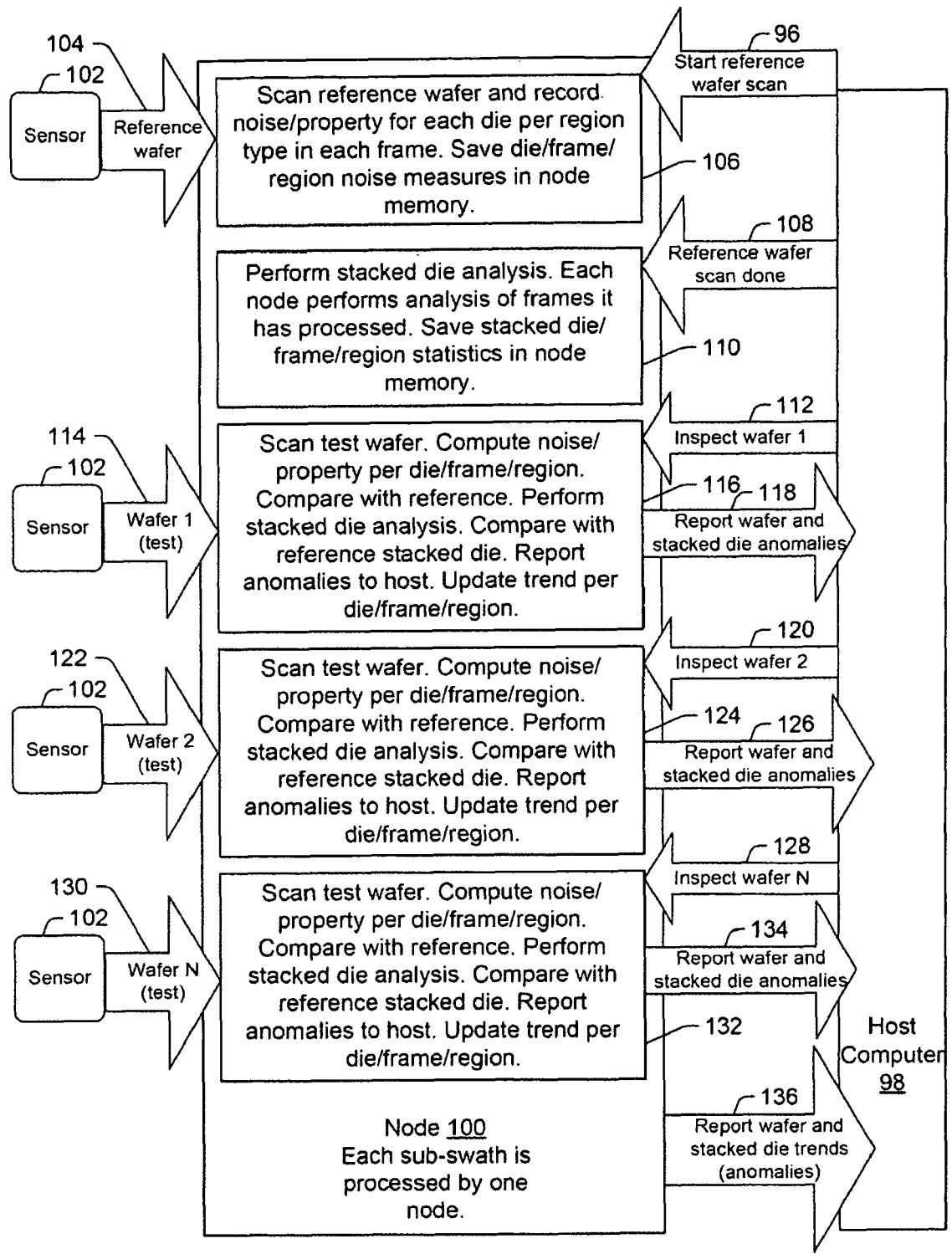
FIG. 5 is a flow chart illustrating one embodiment of a processing sequence for wafer signature monitoring that may be performed by one or more system embodiments described herein.

FIG. 5 illustrates one embodiment of a processing sequence for wafer signature monitoring. In particular, as shown in FIG. 5, in step 96, host computer 98 sends start reference wafer scan command to node 100, which may be one of a set of nodes, and each sub-swath is processed by one node. Node 100 and the set of nodes in which it is included may be further configured as described herein. Host computer 98 may be included in the VI and may be coupled to each of the nodes as described further herein. Upon receipt of the start reference wafer scan command, sensor 102 scans reference wafer 104, and in step 106, node 100 scans the reference wafer and records noise/property for each die per region type in each frame. In step 106, node 100 also saves die/frame/region noise measures in node memory. In step 108, the host computer sends reference wafer scan done command to node 100. In step 110, the node performs stacked die analysis. Each node performs analysis of frames it has processed. The nodes save stacked die/frame/region statistics in storage media coupled to each node.

In step 112, host computer 98 sends inspect wafer 1 (test wafer 1) command to node 100. Upon receipt of the inspect wafer 1 command, sensor 102 scans test wafer 114, and in step 116, node 100 scans the test wafer and computes noise/property per die/frame/region. In this step, the node also compares the noise/property per die/frame/region with the reference. In addition, the node performs stacked die analysis and compares with reference stacked die. The node then reports anomalies to the host computer and updates the trend per die/frame/region. In particular, as shown in step 118, the node reports wafer and stacked die anomalies to the host computer.

In step 120, host computer 98 sends inspect wafer 2 (test wafer 2) command to node 100. Upon receipt of the inspect wafer 2 command, sensor 102 scans test wafer 122, and in step 124, node 100 scans the test wafer and computes noise/property per die/frame/region. In this step, the node also compares the noise/property per die/frame/region with the reference. In addition, the node performs stacked die analysis and compares with reference stacked die. The node then reports anomalies to the host computer and updates the trend per die/frame/region. In particular, as shown in step 126, the node reports wafer and stacked die anomalies to the host computer.

The steps described above for wafers 1 and 2 may be repeated for any N wafers. For example, in step 128, host computer 98 sends inspect wafer N (test wafer N) command to node 100. Upon receipt of the inspect wafer N command, sensor 102 scans test wafer 130, and in step 132, node 100 scans the test wafer and computes noise/property per die/frame/region. In this step, the node also compares the noise/property per die/frame/region with the reference. In addition, the node performs stacked die analysis and compares with reference stacked die. The node then reports anomalies to the host computer and updates the trend per die/frame/region. In particular, as shown in step 134, the node reports wafer and stacked die anomalies to the host computer. In addition, as shown in step 136, the node reports wafer and stacked die trends (anomalies) to the host computer.

The above-described method may also be performed using stored image data instead of image data as it is generated by the detector and received by the processor nodes. In this manner, the above-described method may be performed offline. In addition, the above-described method may include determining the noise and/or property of the portion of the wafer and comparing the noise and/or property with the reference. Furthermore, the method may be performed for the die, frame, region, or some combination thereof.

While commercial offerings for wafer-to-wafer comparison are not available (since wafer-to-wafer comparisons are not practical with currently used methods and systems), it is possible that a stored die image could be used as a reference for a wafer being inspected. However, there is currently no means of using a full wafer as a reference. In addition, if pattern noise varies more across a wafer than it does from the same site on each of multiple wafers, it is possible that a more sensitive inspection can be achieved by comparing wafers.

In one such embodiment, the wafer and the other wafer are processed using different values for at least one wafer-level parameter of a process. For example, the VI relaxes conventional constraints of having both the test and reference die on the same wafer. This capability is particularly useful for process window characterization (PWQ) experiments in which wafer-level process parameters (e.g., etch time) are modulated to assess the impact on pattern dependent defectivity (e.g., spatially systematic defects).

The embodiments described herein may also be used with PWQ that is performed in any manner (e.g., wafer-level process parameter variation experiments and across wafer process parameter variation experiments). For example, a VI may be used in conjunction with PWQ methodology by storing images of PWQ wafers in the arrays of the storage media of the VI. The stored images may then be used for re-inspection of the "virtual wafer(s)" as more information is learned from various "hot spot" analysis sources (e.g., reticle inspection, production DBB, physical failure analysis, etc.). A "hot spot" may be generally defined as a location in the design data printed on the wafer at which a killer defect may be present.

The defect detection described herein may be performed for any application such as tool monitoring. In addition, the embodiments described herein may be configured and used to store historical image data for a few die of each wafer processed in the same process. The set of processor nodes described herein may use such historical image data to evaluate process stability and/or to change the monitoring. For example, stability of the inspection process can be monitored using the image data stored as described further herein. In one such example, the gain and offset of the light source used in the inspection system can be monitored using stored image data for an entire wafer or for a substantially large portion of the wafer. Therefore, much more image data can be used to monitor the inspection process than that which is currently used to monitor inspection processes (e.g., in which one location on a wafer is used to monitor changes in an inspection process from wafer to wafer). As such, the stored image data described herein can be used to monitor more parameters of the inspection process more accurately, which may be advantageous since more than one parameter of the inspection process may drift and drift simultaneously.

The stored image data and/or any information about the wafer and/or process determined using the stored image data can also be used to trigger high resolution data collection. For example, although high resolution data collection may be relatively expensive, high resolution data collection can be used to determine more information about a process (e.g., more than just whether or not the process is within or outside of control limits). Since the stored image data includes much more information about the wafer and can be processed in a number of different manners as described herein, such stored image data can be used to trigger high resolution data collection thereby reducing unnecessary collection of high resolution data and ensuring that high resolution data is collected when it is beneficial to do so. In addition, the embodiments described herein can be configured to store high resolution data in real-time based on triggered events. For example, the decision to store the high resolution data may be made in real-time based on events occurring in production. High resolution image data collection may be performed to collect a high resolution die image that can be used for zooming such that information about the die can be viewed by a user in great detail using the die image.

In one embodiment, the set of processor nodes is configured to perform offline image analysis of the image data stored in the arrays of the storage media to identify an inspection sample plan for another inspection system that has a lower throughput and higher resolution than the inspection system. For example, offline image analysis described further herein can be used to identify an inspection sample plan for slower, higher resolution inspection systems such as the EBI system, which is commercially available from KLA-Tencor. In one such example, a wafer may be scanned using a relatively fast, small pixel inspection system, and the image data generated by scanning can be stored on disk as described further herein. The set of processor nodes may then process the image offline to generate intelligent sampling regions for slower, high resolution systems (e.g., e-beam). In this manner, the set of processor nodes may be configured for intelligent sampling plan generation.

In one embodiment, the image data is generated for a layer on the wafer, and FA and/or electrical testing is performed on the wafer (e.g., after one or more additional layers have been formed on the wafer). The one or more additional layers formed on the wafer may include any suitable layers known in the art, including the layers described further herein, which may be formed using any suitable process or processes known in the art. FA and/or electrical testing may be performed in any suitable manner, including using some of the FA and electrical testing techniques described further herein.

In one embodiment, the set of processor nodes is configured to use the image data stored in the arrays of the storage media and results of electrical testing to determine if one or more characteristics of the wafer are causally related to the results of the electrical testing. The one or more characteristics of the wafer that may be evaluated to determine if they are causally related to the results of the FA include not only defects, but any other information about the wafer that can be determined from the stored image data. Such information may include information about roughness of a layer on the wafer, information about grain size of a layer on the wafer, information about thickness variation on a layer on the wafer, and any other information that can be determined from the stored image data.

In this manner, the embodiments described herein may be configured for virtual FA. Virtual FA is generally the inspection of stored wafer images after electrical test data has been collected. For example, the set of processor nodes may be configured to use the wafer/die/sub-die mass image recording feature of the VI as a means of efficiently determining the likely source of defects that cause electrical circuit faults detected on subsequently processed wafers by any of a number of electrically activated means including, but not limited to, voltage contrast SEM inspection, e-beam probe, built-in self-test, conventional electrical probing, and the like. The circuits involved may be functional product circuits (e.g., advanced logic or memory devices) or test structures specifically designed for high resolution fault observability and diagnosability.

In one embodiment, the set of processor nodes is configured to alter one or more parameters of an inspection process to be performed on the image data stored in the arrays of the storage media using results of electrical testing in combination with mapping of the results of the electrical testing to physical locations on the wafer. For example, the set of processor nodes may be configured to adjust inspection based on feedback from electrical testing plus memory bitmapping or logic mapping with or without FA results. In one such example, electrical test (or one of the aforementioned alternative methods) may be followed by data interpretation techniques for electrical (or logical) to physical mapping to provide the boundaries of regions of interest for correlation to detected defects to define regions of interest for "guided" inspections. Common techniques for this operation include memory "bitmapping" and "logic mapping." Electrical test, bitmapping, logic mapping or physical FA techniques can be used sequentially or in a real time feedback system integrated with VI. By constructing a data de pendant diagnosis flow, information gained from any one of these processes can dynamically feed forward to any of the other processes with or without human intervention for purposes of converging on causal relationships between inspection results and electrical and/or FA results. In this manner, the relationship(s) between inspection and/or inspection optimization and test, bitmapping, logic mapping, FA operations, or some combination thereof does not need to be sequential (the results of one can be fedforward or fedback in a number of different manners).

One alternative to the virtual FA described herein is to perform destructive physical analysis in areas of the wafer determined from the electrical test results, knowledge of the circuit, and fault behavior models. However, this method can be inefficient because of the expense of the equipment and skilled labor required for physical analysis and uncertainty of the exact location of the most likely process layer (z coordinate) and location (2D x and y location) of the fault-causing defect.

One alternative to the virtual FA described herein is to perform conventional inline optical inspection with physical analysis. For example, physical analysis can be augmented with optical inspection to determine the location of pre-existing defects during wafer processing. In particular, the flow may include inspect inline with an inspection system, electrically test the wafer, find correlations between the inspection results and the electrical test results, and perform physical analysis such as SEM/FIB cut in locations with "hits" (e.g., locations that exhibit a correlation). Additional information about the above conventional FA methodology is described in a presentation entitled "Texas Instruments—The Challenges and Advantages of Logic Mapping" by Vij et al. (2003), which is incorporated by reference as if fully set forth herein. However, this method is subject to the uncertainties of signal-to-noise. In particular, since it is not known at the time of inspection where the electrical fault will occur, the entire region to be tested must be treated equivalently.

With the VI embodiments described herein, the above-described flow can be augmented by inserting a re-inspection after test using the stored wafer image data to improve chances of finding the locations of electrically important defects. This flow is basically inspect inline with an inspection system, electrically test the wafer, re-inspect the wafer (using stored image data) with emphasis on circuits with electrical failures not accounted for in initial inspection results, find correlations, and perform physical analysis such as SEM/FIB cut, etc. in locations with "hits" or relatively strong correlations. Each of these steps may be performed as described further herein.

In another embodiment, the set of processor nodes is configured to use the image data stored in the arrays of the storage media and results of electrical testing to select one or more defect detection parameters for inspection of the wafer, and the inspection is to be performed using the image data stored in the arrays of the storage media. For example, virtual FA may be used to leverage a priori knowledge acquired from the electrical test step in the flow to guide the inspection step more specifically to regions likely to contain the DOI. In this manner, inspection of stored wafer images after electrical test data has been collected enables guided inspection optimization based on a priori electrical fault data on specific wafers. In particular, using FA results and the stored image data described herein, defects that are not of interest at the time of the inspection but may be of interest at a later time due to the FA results can be identified in the stored image data. In addition, the results of virtual FA may be used to setup an inspection recipe by correlating stored image data for a whole wafer (or a portion of a wafer) to electrical yield and tuning the recipe based on results of the correlation. This allows for higher sensitivity inspections thus optimizing the likelihood of success. In this manner, the results of electrical testing and/or FA can be used for historical-based inspection recipe setup. One benefit of such inspection recipe setup is that the resulting inspection recipe has been optimized to detect known killer defects (or electrically significant defects).

In some such embodiments, the VI can be used for post-wafer optimization of an inspection recipe even when it is difficult to understand why an inspection missed an excursion detected by end of line (EOL) testing. For example, all or part of a critical wafer may be scanned using multiple optical modes as described further herein. In addition, the images may be stored on the VI as described further herein. The wafer may then be sent through the process to the EOL test. After EOL testing, a Venn diagram for the defects detected by inspection and the EOL test results may be generated and used to determine which defects were missed by the inspection. The stored images on the VI may then be used to re-visit the missed-defect locations in the stored image of the wafer, and the recipe can be optimized based on the stored images.

In an additional embodiment, the set of processor nodes is configured to use the image data stored in the arrays of the storage media and results of electrical testing to determine the likelihood that defects on the wafer caused the results of the electrical testing. For example, virtual FA may include VI inline image data storage in which inspect-able images of the layers and regions of interest are stored for subsequent inspection/test. The image data may, in some cases, be recorded for test chips only or only the portions of the wafer that will be subject to electrical testing and/or electrical FA. In addition, the set of processor nodes may be configured to use information about care areas to save image storage capacity if significant portions of the die are not of interest. In this manner, in effect, the VI allows the user to "defy causality" by non-destructively inspecting layers of the device after processing has buried the layers. It may be advantageous to use multiple optical modes to optimize the chances of detecting fault-causing DOI. It is also possible that storing image data on the VI from multiple inspection platforms may be desired for maximizing the probability of detecting the DOI. The multiple inspection platforms may include different optical modes or different inspection platforms altogether (e.g., one inspection platform may be an electron beam inspection platform, another inspection platform may be a BF platform, etc.). Irrespective of the optical mode most likely to detect the DOI, it is advisable to collect images in the optical mode that provides the highest image resolution to help the user interpret results. In addition, substantially precise coordinates versus design would be optimum to ensure substantially accurate translation between observed electrical signals and subsequently detected defect signals.

Such virtual FA may then include electrical inspection/test in which an electrically testable circuit is submitted to stimulus and measurement, and the test conditions under which electrical faults are observed are recorded. The circuit(s) of interest may include a KLA-Tencor micro-loop structure that is specifically designed for efficient inspection by the EBI system. These "short loop" use cases may be more practical because they involve a bounded number of process steps and have high diagnostic resolution. That is, the image area needed for inspection can be radically reduced after test without compromising the likelihood of detecting the DOI. In this manner, the area of the wafer that is imaged for diagnosis may be relatively small. For instance, the area needed for inspection may be the area of a die on the wafer, which may be imaged using an electron beam inspection system.

In addition, if an electron beam image or other relatively high resolution image of the area is acquired for inspection and the corresponding high resolution image data is stored as described further herein, the stored high resolution image data can be used to perform one or more defect review functions using the VI. In this manner, the VI may also be used as a "virtual review system." A virtual review system would have many of the advantages of the VI embodiments described herein (e.g., reduced exposure of the wafer to radiation, reduced usage of the physical wafer on the review system thereby freeing up the physical wafer and the review system for other tasks, etc.).

The structure could also be a special test structure that can be probed such as a via chain, transistor array, conductor snake and comb, capacitors, etc. The structure could be a functional product chip or test chip including a memory block or random logic. Product chips often have on-board test circuitry that does "built-in self-test" (BIST).

Irrespective of the method, the intent is to provide a mapping between faulty electrical behavior of a physical location on the wafer where the fault is physically occurring to a defect on the wafer. Standard FA problem solving methods can be used to interpret the fault behavior in order to narrow down the candidate regions and layers of the wafer to be examined in detail in the subsequent steps of this flow. For example, LogicMap™, which is commercially available from Magma Design Automation, Inc., San Jose, Calif., may be used to integrate inline defect inspection data with a set of suspected signals and gates generated by the scan diagnostics flow to identify the suspect process step with a high level of confidence. The "care areas" for subsequent inspection may be generated at this point in the flow.

In addition, such virtual FA may include defect inspection. For example, defect detection algorithm conditions may be optimized and applied to the relevant subset of the inline image data using an inspection recipe on the VI that preferentially inspects regions and layers indicated by the electrical test results. The inspection of faulty test structures is analogous to what KLA-Tencor EBI systems do for second pass micro-loop inspection. This ability can be added to the VI. The VI may then detect candidate defects and rank them in order of likelihood of causing observed faults.

One particular example of how virtual FA can be used may include storing image data for a test chip on a wafer with care areas around the M1-M2 via chain structures in optical modes of interest at process layers, which may include: M1 trench litho, etch, post-copper (CU) chemical-mechanical polishing (CMP), via litho, post-via etch, post-tungsten (W) plug CMP, post-M2 trench litho, post-M2 trench etch, and post-M2 Cu-CMP. Such virtual FA may also include testing the M1-M2 via chains with a parametric tester and recording which structures or portions of structures are electrically faulty. Such virtual FA may further include generating "micro-loop-like" care areas just for the faulty test sites. In addition, such virtual FA may include inspecting the stored "virtual wafer" images and identifying defects likely to have caused the observed faults.

In a further embodiment, the set of processor nodes is configured to use the image data stored in the arrays of the storage media, results of electrical testing, design data, and netlist data to determine the likelihood that defects on the wafer caused the results of the electrical testing. For example, it is likely that using physical design data in concert with netlist data would be the most practical way to accomplish the determination of the care areas. These tools are typically used together in computer aided design (CAD) navigation systems designed for electrical testing and/or FA and fault diagnosis. For example, mapping electrical results to a physical location of a root cause is not always easy, particularly in logic areas or devices. However, design data in combination with netlist data may be used with the electrical testing and/or FA results to map the electrical characteristics of the wafer to the physical (defect) characteristics of the wafer. As such, the mapping may be used to determine where on a wafer a candidate defect (a defect that might have caused the electrical testing and/or FA results) might be located such that inspection using the stored image data for the wafer can be used to determine if a physical defect is actually located at that position.

In yet another embodiment, the set of processor nodes is configured to use the image data stored in the arrays of the storage media and results of electrical testing to determine a likelihood that defects on the wafer caused the results of the electrical testing, and the set of processor nodes is configured to determine one or more parameters of physical analysis to be performed on the wafer based on the likelihood. For example, physical FA may be performed and guided by the precise location of defects detected as described above that are most likely to cause the observed fault. The one or more parameters of the physical analysis that may be determined by the embodiments described herein may include any adjustable parameters of the physical analysis. The physical analysis may include any physical analysis known in the art.

The set of processor nodes may also be configured to use the image data stored in the arrays of the storage media and results of electrical testing and/or FA to setup or tune one or more additional defect-related functions or methods. For example, the set of processor nodes may be configured to use the stored image data and the results of electrical testing and/or FA to setup or tune algorithms or methods for performing defect source analysis (DSA), in which a source or root cause of a defect is determined based on inspection results. In addition, since the stored image data may include image data for multiple layers on a wafer, DSA may be setup or tuned such that root causes originating on layers other than those on which a defect is detected can be correlated to inspection results. For example, a root cause on one layer of a wafer may become obvious after additional layers have been formed on the wafer and inspected. In addition, a root cause on one layer of a wafer may not even be detected as a defect during inspection of the layer. However, because image data for multiple layers on a wafer can be stored as described further herein, the stored image data for multiple layers can be processed collectively to determine if there is a correlation between a defect detected on one layer of the wafer and image data stored for other layers on the wafer.

Although embodiments are described above with respect to functions that may be performed by the VI column of processor nodes, it is to be understood that each of the functions may be performed by another set of processor nodes and/or another computer system included in the system. For example, all of the applications using persistent data described herein can be implemented by uploading vast amounts of information (from node memories) to a host computer for analysis that can produce the same results. In addition, the applications using persistent data described herein can be implemented via software modifications to a host computer included in the system and processor nodes and by allocating (adding) any suitable memory to the nodes for supporting these applications. However, the latency in getting the results can be significant and the processing required may not exploit the multi-processor node capacity inherently available in the nodes themselves.

Each of the embodiments of the system described above may be further configured according to any other embodiment(s) described herein.

Another embodiment relates to a method for storing image data generated by scanning a wafer with an inspection system. In this manner, the method may include creating persistent data for the wafer. The method includes separately receiving different portions of image data generated by a detector of an inspection system during scanning of a wafer. Separately receiving different portions of the image data may be performed as described further herein. The method also includes separately sending the different portions or selected portions of the different portions to different arrays of storage media such that all of the image data or a selected portion of the image data generated by the detector during the scanning of the wafer is stored in the different arrays of the storage media. Separately sending the different portions or the selected portions of the different portions to different arrays of storage media may be performed as described further herein.

The embodiment of the method described above may be performed by any of the system embodiments described herein. In addition, the embodiment of the method described above may include performing any step(s) and/or function(s) of any other embodiment(s) described herein.

Figure 6:
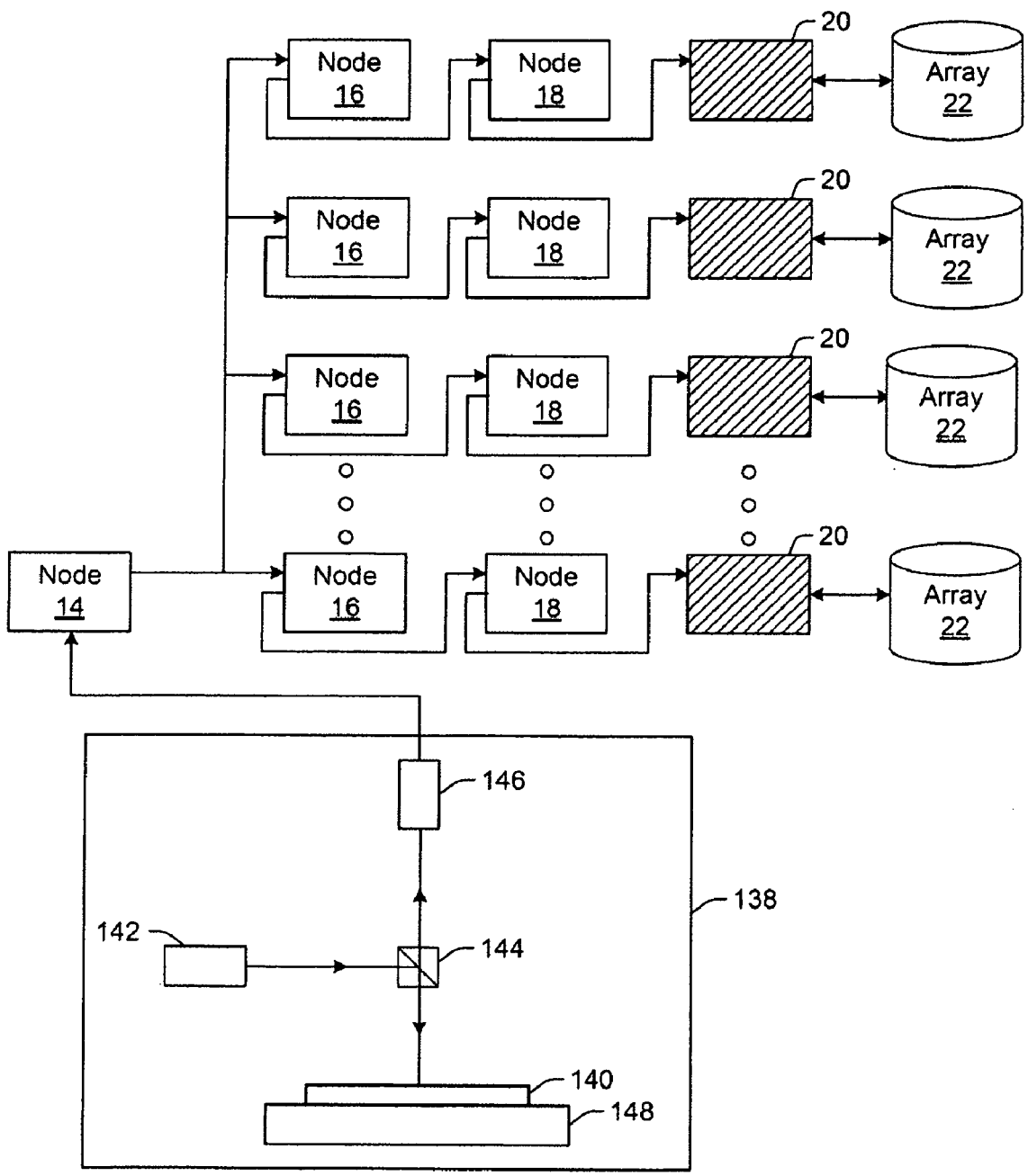
FIG. 6 is a schematic diagram illustrating one embodiment of an inspection system configured to detect defects on a wafer.

An additional embodiment relates to an inspection system configured to detect defects on a wafer. The system includes an inspection subsystem configured to generate image data for a wafer by scanning the wafer. One embodiment of such a system is shown in FIG. 6. For example, as shown in FIG. 6, the system includes inspection subsystem 138. Inspection subsystem 138 is configured to generate image data for wafer 140 by scanning the wafer.

In one embodiment, inspection subsystem 138 includes light source 142. Light source 142 may include any appropriate light source known in the art. Light source 142 may be configured to direct light to beam splitter 144. Beam splitter 144 may be configured to direct light from light source 142 to wafer 140 at a substantially normal angle of incidence. Beam splitter 144 may include any appropriate optical component known in the art.

Light reflected from wafer 140 may pass through beam splitter 144 to detector 146. Detector 146 may include any appropriate detector known in the art that is configured to generate image data in response to light detected by the detector. The image data generated by detector 146 may be used to detect defects on wafer 140. For example, the system includes a set of processor nodes coupled to the inspection subsystem. In particular, as shown in FIG. 6, the system includes set of processor nodes 20 coupled to detector 146 (e.g., via processor 14, set of processor nodes 16, and set of processor nodes 18, each of which may be configured as described herein). The set of processor nodes may be coupled to the inspection subsystem (e.g., a detector of the inspection subsystem) according to any of the embodiments described herein. Each of the processor nodes is configured to receive a portion of the image data generated by the inspection subsystem during the scanning of the wafer. For example, the set of processor nodes may be coupled to the inspection subsystem (e.g., a detector of the inspection subsystem) according to any of the embodiments described herein such that the set of processor nodes can receive the image data generated by the inspection subsystem. In addition, each of the processor nodes is configured to detect defects on the wafer using the portion of the image data received by each of the processor nodes. Each of the processor nodes may be configured to detect the defects on wafer 140 using the portion of the image data received by each of the processor nodes according to any of the embodiments described herein. Furthermore, if the inspection subsystem includes more than one detector (not shown), the set of processor nodes may be coupled to each detector as described above. The set of processor nodes may be further configured as described herein.

The system also includes an array of storage media separately coupled to each of the processor nodes. For example, as shown in FIG. 6, the system includes arrays 22 of storage media separately coupled to each of processor nodes 20. The processor nodes are configured to send all of the image data or a selected portion of the image data received by the processor nodes to the arrays of storage media such that all of the image data or the selected portion of the image data generated by the inspection subsystem during the scanning of the wafer is stored in the arrays of the storage media. The set of processor nodes may be configured in this manner according to any of the embodiments described herein. The arrays of the storage media may be further configured as described herein.

During inspection, wafer 140 may be disposed on stage 148. Stage 148 may include any appropriate mechanical and/or robotic assembly known in the art. The stage and the inspection subsystem may be configured to scan the wafer in any suitable manner. The inspection subsystem shown in FIG. 6 may also include any other suitable components (not shown) known in the art.

As shown in FIG. 6, the inspection subsystem is configured to detect light specularly reflected from the wafer. In this manner, the inspection subsystem shown in FIG. 6 is configured as a BF inspection subsystem. However, the inspection subsystem may be replaced by an inspection subsystem configured as a DF inspection subsystem, an edge contrast (EC) inspection subsystem, an aperture mode inspection subsystem, or any other optical inspection subsystem known in the art. In addition, the inspection subsystem may be configured to perform one or more inspection modes. For example, the inspection subsystem shown in FIG. 6 may be configured to perform DF inspection by altering an angle of incidence at which the light is directed to the wafer and/or an angle at which light is collected from the wafer. In another example, the inspection subsystem shown in FIG. 6 may be configured such that one or more optical components (not shown) such as apertures may be positioned in the illumination path and the collection path such that the inspection subsystem can perform EC mode inspection and/or an aperture mode of inspection.

It is noted that FIG. 6 is provided herein to generally illustrate one configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection subsystem (e.g., by adding functionality described herein to an existing inspection subsystem) such as the inspection subsystems included in the Puma 9000 and 9100 series of tools that are commercially available from KLA-Tencor. Alternatively, the system described herein may be designed "from scratch" to provide a completely new system.

In another embodiment, the optical inspection subsystem shown in FIG. 6 may be replaced by an electron beam inspection subsystem. Examples of commercially available electron beam inspection subsystems that may be included in the system of FIG. 6 include the electron beam inspection subsystems included in the eS25, eS30, and eS31 systems from KLA-Tencor. The embodiments of the system shown in FIG. 6 may be further configured as described herein.

Further modifications and alternative embodiments of various aspects of the invention may be apparent to those skilled in the art in view of this description. For example, systems and methods for creating persistent data for a wafer and using persistent data for inspection-related functions are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured red to store image data generated by scanning a wafer with an inspection system, comprising:
    a set of processor nodes coupled to a detector of an inspection system, wherein each of the processor nodes is configured to receive a portion of image data generated by the detector during scanning of a wafer; and
    an array of storage media separately coupled to each of the processor nodes, wherein the processor nodes are further configured to send all of the image data or a selected portion of the image data received by the processor nodes to the arrays of storage media such that all of the image data or the selected portion of the image data generated by the detector during the scanning of the wafer is stored in the arrays of the storage media, and wherein the set of processor nodes is further configured to use the image data stored in the arrays of the storage media to allow a user to navigate through an image of the entire wafer without using the physical wafer for navigation.

2. The system of claim 1, wherein each of the arrays of the storage media comprises a redundant array of independent disk drives.

3. The system of claim 1, wherein each of the arrays of the storage media comprises computer memory.

4. The system of claim 1, wherein each of the arrays of the storage media comprises a magnetic storage system.

5. The system of claim 1, wherein the set of processor nodes is further configured as a column of processor nodes, and wherein the system further comprises one or more additional columns of processor nodes coupled to the column of processor nodes.

6. The system of claim 1, wherein each of the processor nodes comprises an image computer, and wherein the image computers are interconnected using an Advanced Switching Interconnect fabric.

7. The system of claim 6, wherein the set of processor nodes is further configured as a column of processor nodes, wherein the system further comprises an additional column of processor nodes coupled to the column of processor nodes, wherein the processor nodes in the additional column are configured to perform acquisition of the image data generated by the detector, pre-processing of the image data generated by the detector, and image buffering of the image data generated by the detector, and wherein the processor nodes in the additional column are plugged into the Advanced Switching Interconnect fabric.

8. The system of claim 1, wherein all of the image data generated by the detector during the scanning of the wafer comprises more than one terabyte of image data.

9. The system of claim 1, wherein the image data stored in the arrays of the storage media comprises raw image data.

10. The system of claim 1, wherein the image data is stored in the arrays of the storage media before defect detection is performed using the image data.

11. The system of claim 1, wherein the set of processor nodes is further configured such that the image data is stored in the arrays of the storage media as the image data is received by the set of processor nodes.

12. The system of claim 1, wherein the set of processor nodes and the arrays of the storage media are further configured as a stand alone subsystem configured to simulate the inspection system.

13. The system of claim 1, wherein the set of processor nodes and the arrays of the storage media can be used as a proxy for a full inspection system.

14. The system of claim 1, wherein the set of processor nodes and the arrays of the storage media are further configured to function as a stand alone subsystem that emulates a user interface of the inspection system.

15. The system of claim 1, wherein the set of processor nodes is further configured to perform one or more functions in an offline mode to simulate one or more functions that could be performed by or using the inspection system.

16. The system of claim 1, wherein the set of processor nodes and the arrays of the storage media are further configured as a virtual inspection system.

17. The system of claim 1, wherein the set of processor nodes is further configured to combine the image data stored in the arrays of the storage media with a stream of image data as the stream of image data is generated by the detector and received by the set of processor nodes.

18. The system of claim 1, wherein the set of processor nodes and the arrays of the storage media are embedded in the inspection system.

19. The system of claim 1, wherein the set of processor nodes is further configured to generate an image of the entire wafer using all of the image data generated by the detector during the scanning of the wafer that is stored in the arrays of the storage media.

20. The system of claim 1, wherein the wafer comprises a patterned wafer.

21. The system of claim 1, wherein the set of processor nodes is further configured to archive images of the wafer acquired in multiple imaging modes of the inspection system, and wherein the archived images can be used for mode selection for an inspection recipe.

22. The system of claim 1, wherein the set of processor nodes is further configured to tune an inspection recipe using the image data stored in the arrays of the storage media.

23. The system of claim 1, wherein the set of processor nodes is further configured to select one or more defect detection parameters for inspection of the wafer using all of the image data or the selected portion of the image data generated by the detector during the scanning of the wafer that is stored in the arrays of the storage media.

24. The system of claim 1, wherein the set of processor nodes is further configured to select one or more defect detection parameters for inspection of the wafer using the image data generated by the detector during the scanning of the wafer that is stored in the arrays of the storage media without requiring additional image data generated by performing additional scanning of the wafer.

25. The system of claim 1, wherein the set of processor nodes is further configured to select one or more detect detection parameters for inspection of the wafer by identifying two or more different types of regions on the wafer using the image data stored in the arrays of the storage media and by separately determining the one or more defect detection parameters for the two or more different types of regions using the image data stored in the arrays of the storage media.

26. The system of claim 1, wherein the inspection system is configured as a bright field small pixel inspection system, and wherein the set of processor nodes is further configured to archive images of wafers generated by the inspection system.

27. The system of claim 1, wherein the set of processor nodes is further configured to perform offline image analysis of the image data stored in the arrays of the storage media to identify an inspection sample plan for another inspection system that has a lower throughput and higher resolution than the inspection system.

28. The system of claim 1, wherein the set of processor nodes is further configured to detect defects on the wafer only after all of the image data or the selected portion of the image data generated by the detector during the scanning of the wafer is stored.

29. The system of claim 1, wherein the set of processor nodes is further configured to detect defects on the wafer only after all of the image data or the selected portion of the image data generated by the detector during the scanning of the wafer is stored, wherein defect detection is performed by applying a defect detection algorithm to the image data, and wherein the defect detection algorithm is selected regardless of the speed at which the defect detection algorithm can be applied to the image data.

30. The system of claim 1, wherein the set of processor nodes is further configured to detect defects on the wafer by applying two or more defect detection algorithms to the image data stored in the arrays of the storage media, and wherein the two or more defect detection algorithms are different in at least one parameter of the two or more defect detection algorithms.

31. The system of claim 1, wherein the set of processor nodes is further configured to detect defects on the wafer by processing the image data stored in the arrays of the storage media in multiple passes.

32. The system of claim 1, wherein the set of processor nodes is further configured to detect defects on the wafer by processing the image data stored in the arrays of the storage media in multiple passes, and wherein one of the multiple passes comprises identifying one or more portions of the image data corresponding to one or more regions of interest on the wafer.

33. The system of claim 1, wherein the set of processor nodes is further configured to detect defects on the wafer by processing the image data stored in the arrays of the storage media in multiple passes, and wherein one of the multiple passes comprises applying one or more algorithms to the image data to extract the defects and suppress detection of false defects.

34. The system of claim 1, wherein the set of processor nodes is further configured to detect defects on the wafer using multiple streams of image data stored in the array of the storage media.

35. The system of claim 1, wherein the set of processor nodes is further configured to detect defects on the wafer using multiple streams of image data, wherein one of the multiple streams comprises the image data stored in the arrays of the storage media, wherein another of the multiple streams comprises image data generated by the detector during additional scanning of the wafer, and wherein the scanning and the additional scanning are performed with one or more different parameters of the inspection system.

36. The system of claim 1, wherein the set of processor nodes is further configured to detect defects on the wafer using multiple streams of data, and wherein the multiple streams comprise the image data stored in the arrays of the storage media, statistical data for the water, and design data for the wafer.

37. The system of claim 1, wherein the set of processor nodes is further configured to detect defects on the wafer using multiple streams of data, wherein one of the multiple streams comprises the image data stored in the arrays of the storage media, and wherein another of the multiple streams comprises data not acquired by the inspection system.

38. The system of claim 1, wherein the set of processor nodes is further configured to perform wafer inspection using a die context map stored in the arrays of the storage media for binning of defects detected during the wafer inspection and for determining sensitivity regions for the wafer inspection.

39. The system of claim 1, wherein the set of processor nodes is further configured to generate a die context map from design layout generated offline and to store the resulting die context map in the arrays of the storage media.

40. The system of claim 1, wherein the set of processor nodes is further configured to generate a die context map using image processing algorithms to process a wafer image previously stored in the arrays of the storage media and to store the die context map in the arrays of the storage media.

41. The system of claim 1, wherein the set of processor nodes is further configured to detect defects on the wafer using the image data stored in the arrays of the storage media by comparing a portion of the image data corresponding to a die on the wafer to a standard reference die and by comparing a different portion of the image data corresponding to the die on the wafer to a corresponding portion of the image data corresponding to a different die on the wafer.

42. The system of claim 1, wherein the set of processor nodes is further configured to detect defects on the wafer using the image data stored in the arrays of the storage media by comparing a portion of the image data corresponding to a die on the wafer to another portion of the image data corresponding to a different die on the wafer, and wherein the portion of the image data and the other portion of the image data are included in a single stream of the image data.

43. The system of claim 1, wherein the set of processor nodes is further configured to generate a standard reference die using image data for two or more dies on one or more wafers and to store the standard reference die in the arrays of the storage media.

44. The system of claim 1, wherein the set of processor nodes is further configured to perform wafer inspection by comparing image data corresponding to a die on the wafer to a standard reference die, and wherein the image data corresponding to the die on the wafer and the standard reference die are stored in the arrays of the storage media.

45. The system of claim 1, wherein the set of processor nodes is further configured to perform wafer inspection by comparing a standard reference die stored in the arrays of the storage media to image data corresponding to a die on the wafer as the image data corresponding to the die is received from the detector.

46. The system of claim 1, wherein the set of processor nodes is further configured to perform wafer property signature analysis using the image data stored in the arrays of the storage media.

47. The system of claim 1, wherein the set of processor nodes is further configured to generate an image of the entire wafer using all of the image data generated by the detector during the scanning of the wafer that is stored in the arrays of the storage media, and wherein the set of processor nodes is further configured to perform local image processing of the image and non-local image processing of the image.

48. The system of claim 1, wherein the set of processor nodes is further configured to perform processing of the image data stored in the arrays of the storage media and to use results of said processing to determine if additional image data for the wafer is to be acquired by scanning the wafer or from the arrays of the storage media.

49. The system of claim 1, wherein the set of processor nodes is further configured to generate an image of the wafer using the image data stored in the arrays of the storage media and at least one additional source of data for the wafer.

50. The system of claim 1, wherein the set of processor nodes is further configured to compare the image data for the wafer stored in the arrays of the storage media with image data for another wafer.

51. The system of claim 1, wherein the set of processor nodes is further configured to compare the image data for the wafer stored in the arrays of the storage media with image data for another wafer, and wherein the wafer and the other wafer are processed using different values for at least one wafer-level parameter of a process.

52. The system of claim 1, wherein the set of processor nodes is further configured to generate an image of the entire wafer using all of the image data generated by the detector during the scanning of the wafer that is stored in the arrays of the storage media, and wherein the set of processor nodes is further configured to send the image to a review system on which defects on the wafer are to be reviewed such that the image and output for the wafer generated by the review system can be used to select one or more defect detection parameters for inspection of the wafer using the image of the entire wafer and without requiring additional image data generated by the inspection system.

53. The system of claim 1, wherein the set of processor nodes is further configured to use the image data stored in the arrays of the storage media and results of electrical testing to determine if one or more characteristics of the wafer are causally related to the results of the electrical testing.

54. The system of claim 1, wherein the set of processor nodes is further configured to use the image data stored in the arrays of the storage media and results of electrical testing to select one or more defect detection parameters for inspection of the wafer, and wherein the inspection is to be performed using the image data stored in the arrays of the storage media.

55. The system of claim 1, wherein the set of processor nodes is further configured to use the image data stored in the arrays of the storage media and results of electrical testing to determine the likelihood that defects on the wafer caused the results of the electrical testing.

56. The system of claim 1, wherein the set of processor nodes is further configured to use the image data stored in the arrays of the storage media, results of electrical testing, design data, and netlist data to determine a likelihood that defects on the wafer caused the results of the electrical testing.

57. The system of claim 1, wherein the set of processor nodes is further configured to alter one or more parameters of an inspection process to be performed on the image data stored in the arrays of the storage media using results of electrical testing in combination with mapping of the results of electrical testing to physical locations on the wafer.

58. The system of claim 1, wherein the set of processor nodes is further configured to use the image data stored in the arrays of the storage media and results of electrical testing to determine a likelihood that defects on the wafer caused the results of the electrical testing, and wherein the set of processor nodes is further configured to determine one or more parameters of physical analysis to be performed on the wafer based on the likelihood.

59. The system of claim 1, wherein the image data is generated by the detector during the scanning of the wafer using more than one optical configuration of the inspection system.

60. An inspection system configured to detect defects on a wafer, comprising:
- an inspection subsystem configured to generate image data for a wafer by scanning the wafer;
- a set of processor nodes coupled to the inspection subsystem, wherein each of the processor nodes is configured to receive a portion of the image data generated by the inspection subsystem during the scanning of the wafer, and wherein each of the processor nodes is further configured to detect defects on the wafer using the portion of the image data received by each of the processor nodes; and
- an array of storage media separately coupled to each of the processor nodes, wherein the processor nodes are further configured to send all of the image data or a selected portion of the image data received by the processor nodes to the arrays of storage media such that all of the image data or the selected portion of the image data generated by the inspection subsystem during the scanning of the wafer is stored in the arrays of the storage media, and wherein the set of processor nodes is further configured to use the image data stored in the arrays of the storage media to allow a user to navigate through an image of the entire wafer without using the physical wafer for navigation.

61. A method for storing image data generated by scanning a wafer with an inspection system, comprising:
- separately receiving different portions of image data generated by a detector of an inspection system during scanning of a wafer using a set of processor nodes;
- separately sending the different portions or selected portions of the different portions to different arrays of storage media using the set of processor nodes such that all of the image data or a selected portion of the image data generated by the detector during the scanning of the wafer is stored in the different arrays of the storage media; and
- using the image data stored in the arrays of the storage media and the set of processor nodes to allow a user to navigate through an image of the entire wafer without using the physical wafer for navigation.

* * * * *